US011800329B2

(12) United States Patent
Cheung et al.

(10) Patent No.: US 11,800,329 B2
(45) Date of Patent: *Oct. 24, 2023

(54) METHOD AND APPARATUS TO MANAGE COMMUNICATION

(71) Applicant: IpVenture, Inc., San Jose, CA (US)

(72) Inventors: Kwok Wai Cheung, Tai Po (HK); Peter P. Tong, Mountain View, CA (US); C. Douglass Thomas, Saratoga, CA (US)

(73) Assignee: IngenioShare, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,458

(22) Filed: Feb. 19, 2020

(65) Prior Publication Data
US 2020/0186975 A1    Jun. 11, 2020

Related U.S. Application Data

(63) Continuation of application No. 16/556,205, filed on Aug. 29, 2019, which is a continuation of application
(Continued)

(51) Int. Cl.
*H04W 4/14* (2009.01)
*G06Q 10/10* (2023.01)
(Continued)

(52) U.S. Cl.
CPC .............. *H04W 4/14* (2013.01); *G06Q 10/10* (2013.01); *H04M 3/436* (2013.01);
(Continued)

(58) Field of Classification Search
CPC .. H04M 2250/02; H04B 1/3805; G06Q 10/10
(Continued)

(56) References Cited

U.S. PATENT DOCUMENTS

| 5,425,516 A | 6/1995 | Daines |
| 5,548,636 A | 8/1996 | Bannister et al. |

(Continued)

FOREIGN PATENT DOCUMENTS

| CN | 1453981 | 11/2003 |
| EP | 1059798 A2 | 12/2000 |

(Continued)

OTHER PUBLICATIONS

Office Action for U.S. Appl. No. 12/798,995, dated Apr. 11, 2011.
(Continued)

*Primary Examiner* — Kiet M Doan

(57) ABSTRACT

A computer-implemented system and method to manage the communication of a user are disclosed. In one embodiment, when a person tries to electronically convey a message to the user, the status of the user, the identity of the person, and the urgency of the message can be identified. The access priority of the person can be determined based on the person's identity. Then, the message can be managed using one or more rules and in view of the status of the user, the access priority of the person and the urgency of the message. In one embodiment, the message can be received by the user via a headset.

54 Claims, 9 Drawing Sheets

Related U.S. Application Data

No. 15/704,181, filed on Sep. 14, 2017, now Pat. No. 10,492,038, which is a continuation of application No. 15/469,440, filed on Mar. 24, 2017, now Pat. No. 10,142,810, which is a continuation of application No. 14/922,344, filed on Oct. 26, 2015, now Pat. No. 9,736,664, which is a continuation of application No. 14/272,632, filed on May 8, 2014, now Pat. No. 9,204,268, which is a continuation of application No. 12/798,995, filed on Apr. 14, 2010, now Pat. No. 8,744,407, which is a continuation of application No. 11/452,115, filed on Jun. 12, 2006, now Pat. No. 7,729,688, which is a continuation-in-part of application No. 11/006,343, filed on Dec. 7, 2004, now Pat. No. 7,116,976.

(60) Provisional application No. 60/527,565, filed on Dec. 8, 2003, provisional application No. 60/689,686, filed on Jun. 10, 2005.

(51) Int. Cl.
    *H04M 3/436*     (2006.01)
    *H04W 4/16*     (2009.01)
    *H04W 4/12*     (2009.01)

(52) U.S. Cl.
    CPC ........... *H04M 3/4365* (2013.01); *H04W 4/12* (2013.01); *H04W 4/16* (2013.01); *H04M 2201/60* (2013.01); *H04M 2203/2011* (2013.01); *H04M 2203/651* (2013.01); *H04M 2207/18* (2013.01)

(58) Field of Classification Search
    USPC ................................................ 455/41.2, 130
    See application file for complete search history.

(56) References Cited

U.S. PATENT DOCUMENTS

| | | |
|---|---|---|
| 5,610,970 A | 5/1997 | Fuller et al. |
| 5,752,191 A | 5/1998 | Fuller et al. |
| 5,758,079 A | 5/1998 | Ludwig et al. |
| 5,828,731 A | 10/1998 | Szlam et al. |
| 5,930,700 A | 7/1999 | Pepper et al. |
| 5,970,388 A | 10/1999 | Will |
| 6,119,022 A | 9/2000 | Osborn et al. |
| 6,241,612 B1 | 6/2001 | Heredia |
| 6,327,628 B1 | 12/2001 | Anuff et al. |
| 6,359,892 B1 | 3/2002 | Szlam |
| 6,463,462 B1 | 10/2002 | Smith et al. |
| 6,577,859 B1 | 6/2003 | Zahavi et al. |
| 6,636,888 B1 | 10/2003 | Bookspan et al. |
| 6,665,534 B1 | 12/2003 | Conklin et al. |
| 6,788,766 B2 | 9/2004 | Logan |
| 6,801,793 B1 | 10/2004 | Aarnio et al. |
| 6,816,578 B1 | 11/2004 | Kredo et al. |
| 6,819,757 B1 | 11/2004 | Cook et al. |
| 6,819,945 B1 | 11/2004 | Chow et al. |
| 6,828,924 B2 | 12/2004 | Gustavsson et al. |
| 6,978,136 B2 | 12/2005 | Jenniges et al. |
| 7,010,288 B2 | 3/2006 | Brown et al. |
| 7,010,332 B1 | 3/2006 | Irvin et al. |
| 7,027,842 B2 | 4/2006 | Zhang et al. |
| 7,043,261 B2 | 5/2006 | Krishnan |
| 7,058,036 B1 | 6/2006 | Yu et al. |
| 7,072,452 B1 | 7/2006 | Roberts et al. |
| 7,085,253 B2 | 8/2006 | Yang |
| 7,107,010 B2 | 9/2006 | Heinonen et al. |
| 7,110,963 B2 | 9/2006 | Negreiro |
| 7,111,044 B2 | 9/2006 | Lee |
| 7,116,976 B2 | 10/2006 | Thomas et al. |
| 7,188,073 B1 | 3/2007 | Tam et al. |
| 7,224,775 B1 | 5/2007 | Shaffer et al. |
| 7,287,056 B2 | 10/2007 | Loveland et al. |
| 7,317,706 B1 | 1/2008 | Hao et al. |
| 7,346,630 B2 | 3/2008 | Eichstaedt et al. |
| 7,376,434 B2 | 5/2008 | Thomas et al. |
| 7,403,972 B1 | 7/2008 | Lau et al. |
| 7,428,580 B2 | 9/2008 | Hullfish et al. |
| 7,587,039 B1 | 9/2009 | Koch |
| 7,649,877 B2 | 1/2010 | Vieri et al. |
| 7,686,693 B2 | 3/2010 | Danieli et al. |
| 7,729,688 B2 | 6/2010 | Cheung et al. |
| 7,792,552 B2 | 9/2010 | Thomas et al. |
| 7,890,128 B1 | 2/2011 | Thomas et al. |
| 7,904,516 B2 | 3/2011 | Chern |
| 8,014,723 B2 * | 9/2011 | Batey, Jr. ............. H04B 1/3805 455/41.2 |
| 8,112,104 B1 | 2/2012 | Thomas et al. |
| 8,280,419 B1 | 10/2012 | Thomas et al. |
| 8,353,773 B2 | 1/2013 | Sasaki et al. |
| 8,391,459 B2 | 3/2013 | Jackson et al. |
| 8,429,231 B2 | 4/2013 | Wu et al. |
| 8,737,978 B1 | 5/2014 | Thomas et al. |
| 8,744,407 B2 | 6/2014 | Cheung et al. |
| 8,827,811 B2 | 9/2014 | Kim et al. |
| 9,043,212 B2 | 5/2015 | Moore et al. |
| 9,204,268 B2 | 12/2015 | Cheung et al. |
| 9,555,334 B2 | 1/2017 | Bernard et al. |
| 9,736,664 B2 | 8/2017 | Cheung et al. |
| 10,142,810 B2 | 11/2018 | Cheung et al. |
| 10,183,219 B2 | 1/2019 | Linden et al. |
| 10,207,191 B2 | 2/2019 | Jensen |
| 10,492,038 B2 | 11/2019 | Cheung et al. |
| 10,708,727 B2 | 7/2020 | Cheung et al. |
| 11,019,199 B2 | 5/2021 | Thomas et al. |
| 2001/0011014 A1 | 8/2001 | Higuchi et al. |
| 2001/0012336 A1 | 8/2001 | Joyce et al. |
| 2001/0014611 A1 | 8/2001 | Dufort |
| 2001/0028709 A1 | 10/2001 | Makela et al. |
| 2001/0031633 A1 | 10/2001 | Tuomela et al. |
| 2001/0032234 A1 | 10/2001 | Summers et al. |
| 2002/0067806 A1 | 6/2002 | Rodriguez et al. |
| 2002/0073207 A1 | 6/2002 | Widger et al. |
| 2002/0094067 A1 | 7/2002 | August |
| 2002/0102969 A1 | 8/2002 | Enns et al. |
| 2002/0116461 A1 | 8/2002 | Diacakis et al. |
| 2002/0142756 A1 | 10/2002 | Rutledge et al. |
| 2002/0181671 A1 | 12/2002 | Logan |
| 2002/0181672 A1 | 12/2002 | Cannell et al. |
| 2002/0183114 A1 | 12/2002 | Takahashi et al. |
| 2003/0028380 A1 | 2/2003 | Freeland et al. |
| 2003/0028621 A1 | 2/2003 | Furlong et al. |
| 2003/0039339 A1 | 2/2003 | Luehrig et al. |
| 2003/0041048 A1 | 2/2003 | Balasuriya |
| 2003/0062998 A1 | 4/2003 | Rubenstein |
| 2003/0064716 A1 | 4/2003 | Gailey et al. |
| 2003/0065779 A1 | 4/2003 | Malik |
| 2003/0103600 A1 | 6/2003 | Potter |
| 2003/0105854 A1 | 6/2003 | Thorsteinsson et al. |
| 2003/0112948 A1 | 6/2003 | Brown et al. |
| 2003/0129968 A1 | 7/2003 | Earl |
| 2003/0191676 A1 | 10/2003 | Templeton |
| 2003/0191814 A1 | 10/2003 | Tran |
| 2003/0216178 A1 | 11/2003 | Danieli et al. |
| 2003/0232629 A1 | 12/2003 | Jang et al. |
| 2004/0001480 A1 | 1/2004 | Tanigawa et al. |
| 2004/0024882 A1 | 2/2004 | Austin et al. |
| 2004/0047339 A1 * | 3/2004 | Wang .................. H04L 41/5048 370/352 |
| 2004/0072585 A1 | 4/2004 | Le et al. |
| 2004/0078340 A1 | 4/2004 | Evans |
| 2004/0122979 A1 | 6/2004 | Kirkland |
| 2004/0143667 A1 | 7/2004 | Jerome |
| 2004/0203794 A1 | 10/2004 | Brown et al. |
| 2004/0203919 A1 | 10/2004 | Ross et al. |
| 2004/0240650 A1 | 12/2004 | Bear et al. |
| 2004/0248596 A1 | 12/2004 | Panchal |
| 2005/0013419 A1 | 1/2005 | Pelaez et al. |
| 2005/0020288 A1 | 1/2005 | Davis |
| 2005/0027385 A1 | 2/2005 | Yuch |
| 2005/0037785 A1 | 2/2005 | Chen |

(56) References Cited

U.S. PATENT DOCUMENTS

| | | |
|---|---|---|
| 2005/0038690 A1 | 2/2005 | Hayes-Roth |
| 2005/0071253 A1 | 3/2005 | Yang |
| 2005/0107130 A1 | 5/2005 | Peterson, II |
| 2005/0130631 A1 | 6/2005 | Maguire et al. |
| 2005/0136955 A1 | 6/2005 | Mumick et al. |
| 2005/0191994 A1 | 9/2005 | May et al. |
| 2005/0192061 A1 | 9/2005 | May et al. |
| 2005/0273327 A1 | 12/2005 | Krishnan |
| 2006/0003803 A1 | 1/2006 | Thomas et al. |
| 2006/0031303 A1 | 2/2006 | Pang |
| 2006/0075038 A1 | 4/2006 | Mason et al. |
| 2006/0098650 A1 | 5/2006 | Beninato et al. |
| 2006/0126806 A1* | 6/2006 | Trandal ............. H04M 3/42195 379/88.26 |
| 2006/0168054 A1 | 7/2006 | Burkhart et al. |
| 2006/0212561 A1 | 9/2006 | Feng |
| 2006/0239419 A1 | 10/2006 | Joseph et al. |
| 2006/0259565 A1 | 11/2006 | Cheung et al. |
| 2006/0276210 A1 | 12/2006 | Thomas et al. |
| 2006/0288099 A1 | 12/2006 | Jefferson et al. |
| 2007/0005368 A1 | 1/2007 | Chutorash et al. |
| 2007/0047522 A1 | 3/2007 | Jefferson et al. |
| 2007/0238474 A1 | 10/2007 | Ballas |
| 2007/0293186 A1 | 12/2007 | Lehmann |
| 2008/0261636 A1 | 10/2008 | Lau et al. |
| 2010/0114958 A1 | 5/2010 | Korenshtein |
| 2010/0205272 A1 | 8/2010 | Cheung et al. |
| 2011/0151582 A1 | 6/2011 | Basile |
| 2011/0151852 A1 | 6/2011 | Olincy et al. |
| 2014/0242956 A1 | 8/2014 | Cheung et al. |
| 2014/0256293 A1 | 9/2014 | Thomas et al. |
| 2016/0044474 A1 | 2/2016 | Cheung et al. |
| 2017/0201872 A1 | 7/2017 | Cheung et al. |
| 2018/0014169 A1 | 1/2018 | Cheung et al. |
| 2019/0387371 A1 | 12/2019 | Cheung et al. |

FOREIGN PATENT DOCUMENTS

| | | | |
|---|---|---|---|
| WO | WO 01/45343 | A2 | 6/2001 |
| WO | WO 01/45343 | A2 | 6/2023 |

OTHER PUBLICATIONS

Notice of Allowance for U.S. Appl. No. 12/798,995 dated Sep. 29, 2011.
Notice of Allowance for U.S. Appl. No. 12/798,995 dated Jan. 3, 2012.
Notice of Allowance for U.S. Appl. No. 12/798,995, dated May 9, 2012.
Notice of Allowance for U.S. Appl. No. 12/798,995, dated Oct. 3, 2012.
Notice of Allowance for U.S. Appl. No. 12/798,995, dated Jul. 16, 2013.
Notice of Allowance for U.S. Appl. No. 12/798,995, dated Oct. 30, 2013.
Notice of Allowance for U.S. Appl. No. 12/798,995, dated Feb. 20, 2014.
Office Action for U.S. Appl. No. 14/272,632, dated Jul. 27, 2015.
Notice of Allowance for U.S. Appl. No. 14/272,632, dated Sep. 18, 2015.
Office Action for U.S. Appl. No. 14/922,344, dated Apr. 27, 2016.
Office Action for U.S. Appl. No. 14/922,344, dated Oct. 7, 2016.
Notice of Allowance for U.S. Appl. No. 14/922,344, dated Feb. 14, 2017.
Notice of Allowance for U.S. Appl. No. 14/922,344, dated Mar. 6, 2017.
Notice of Allowance for U.S. Appl. No. 15/469,440, dated Sep. 6, 2017.
Notice of Allowance for U.S. Appl. No. 15/469,440, dated Dec. 19, 2017.
Notice of Allowance for U.S. Appl. No. 15/469,440, dated Aug. 8, 2018.
Notice of Allowance for U.S. Appl. No. 15/469,440, dated Sep. 27, 2018.
Notice of Allowance for U.S. Appl. No. 15/704,181, dated Apr. 27, 2018.
Notice of Allowance for U.S. Appl. No. 15/704,181, dated Aug. 22, 2018.
Notice of Allowance for U.S. Appl. No. 15/704,181, dated Nov. 6, 2018.
Notice of Allowance for U.S. Appl. No. 15/704,181, dated Jul. 2, 2019.
First Office Action for CN Patent Application No. 200680027964.9, dated Mar. 26, 2010 (17 pages).
Second Office Action for CN Patent Application No. 200680027964.9, dated Oct. 25, 2010 (14 pages).
Third Office Action for CN Patent Application No. 200680027964.9, dated Apr. 8, 2011 (11 pages).
Notice of Rejection for CN Patent Application No. 200680027964.9, dated Jan. 6, 2012 (11 pgs.).
AIM Buddy List, https://web.archive.org/web/20050531083304/http://www.aim.com/help_faq/starting_out/buddylist.adp?aolp=, downloaded Aug. 9, 2019, 1 pg.
AIM® Inside the Sidekick, https://web.archive.org/web/20050519114310/http:/mymobile.aol.com/portal/im/pdfs/tmobile/AIM_SIDEKICK_UG_tmobile.pdf, copyright 2002 by America Online, Inc., 13 pgs.
AIM Registration, https://web.archive.org/web/20041216085601/http:/www.aim.com:80/help_faq/starting_out/registration.adp?aolp=, downloaded Aug. 9, 2019, 2 pgs.
"AOL® Instant Messenger™," https://web.archive.org/web/20050601001345/htts:/www.aim.com/, downloaded Aug. 6, 2019, 2 pgs.
"Company Overview", http://www.fastmobile.com/company_overview.html, downloaded Nov. 5, 2003, p. 1.
Download AIM for Windows, https://web.archive.org/web/20050204020358/http:/channels.netscape.com/wrap/linker.jsp?floc=at_oswin_1_12&ref=http://www.aim.com/get_aim/win/latest_win.adp?aolp=#whatsnew, downloaded Aug. 9, 2019, 2 pgs.
"Introducing the Tellme Voice Application Network", Tellme, http://www.tellme.com/products/, downloaded Oct. 2, 2003, p. 1.
"Iotum History," Iotum Corp., http://iotum.com/simplyrelevant/2006/04/03/iotum-history/, downloaded May 15, 2006, pp. 1-4.
"Messaging", Vodafone Group, 2001, http:www.vodafone.co.nz/business/10.2.3_messaging.jsp, downloaded Oct. 14, 2003, pp. 1-2.
"Microsoft Windows Messenger: Go Beyond Text with Voice & Video Chats", Dell Inc., http://www.dell.com/us/en/dhs/topics/segtopic_002_xp_im.htm, downloaded Oct. 2, 2003, pp. 1-2.
"Microsoft Windows Messenger: Instantly Communicate with Family and Friends Messenger", Dell Inc., http://www.dell.com/us/en/dhs/topics/segtopic_001_xp_im.htm, downloaded Oct. 2, 2003, pp. 1-3.
"Our Solution," Iotum Corp., http://www.iotum.com/our_solution.php, downloaded May 15, 2006, pp. 1-2.
Short Message Service/Interactive Voice Response (SMS/IVR), Lucent Technologies, 2003, pp. 1-2.
"Text messaging", Vodafone Group, 2001, Vodafone—Services, "All about text messaging", http://www.vodafone.co.nz/services/07.a.1_two_way_messaging.jsp?hd=4yourbusiness& . . . , downloaded Oct. 14, 2003, pp. 1-2.
"We bring relevance to communications," Cnet News, Ina Fried, Jul. 21, 2005, pp. 1-2.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
BlackBerry, "Voice and SMS", http://www.blackberry.com/products/service/voices_sms.shtml?DCPID=hmsvoice downloaded Oct. 2, 2003, p. 1.
Bulk, F. "Final Project: Skype," http://www1.cs.columbia.edu/~salman/skype/frank.pdf, May 5, 2004, pp. 23.
Calsyn, Martin and Desseault, Lisa, "Presence Information Protocol Requirements," Internet Draft, Feb. 9, 1998, pp. 1-27.

(56) References Cited

OTHER PUBLICATIONS

Emergin Inc., "Emergin WirelessOffice 5.0", http://www.emergin.com/?source=overture, downloaded Oct. 2, 2003, p. 1.

Fastmobile Inc., "Dialog GSM launches Push 'n' Talk walkie talkie service Push to Talk over Cellular Now in Sri Lanka Dialog GSM Pioneers Latest GSM Advancement", Press Release, Dec. 1, 2004, pp. 1-2.

Fastmobile, "fastmobile's fastchat™ Instant Communications Application is Coming to Thousands of Mobile Phone Retail Stores Nationwide", fastmobile Press Release, Sep. 15, 2003, pp. 1-3.

IMBOT, Press Release, "IMBOT offers new Text 2 Voice Service Text 2 Voice service enables wireless customers to send voice messages from 2-Way devices", Oct. 29, 2001, pp. 1-2.

Internet Traveler, "Welcome to the Inter.Net Communicator Tour!", http://www.inter.net/traveler/tour/communicator_messaging.php, downloaded Oct. 14, 2003, p. 1.

J. Rosenberg, H. Schulzrinne, Internet Draft, "SIP For Presence," http://www.alternic.org/drafts/drafts-r-s/draft-rosenberg=sip-pip-00.txt, Nov. 13, 1998, Bell Laboratories, Columbia, pp. 1-31.

Joseph, Anthony D. et al., "The Case for Services over Cascaded Networks", EECS Department, CS Division, University of California, Berkeley, http://iceberg.cs.berkeley.edu/, International Conference on Wireless and Mobile Multimedia 1998, pp. 1-9.

MSN Messenger Version 7.0, "Messenger," https://web.archive.org/web/20050601023444/http:/messenger.msn.com . . . , downloaded Aug. 6, 2019, 2 pgs.

MobileShop, "SMS—also know as text messaging", http://www.mobileshop.org/howitworks.sms.htm, downloaded Oct. 14, 2003, pp. 1-2.

MSN Messenger:mac, https://web.archive.org/web/20050604080622/http://www.microsoft.com/mac/default.aspx?pid=msnmessenger, downloaded Aug. 9, 2019, 2 pgs.

MSN Messenger, "Communicate with MSN® Messenger," https://web.archive.org/web/20051013055708/http://www.imagine-msn.com/messenger/post/communicate/instantmessage.aspx, downloaded Aug. 9, 2019, 2 pgs.

MSN Messenger, "Download MSN Messenger," https://web.archive.org/web/20050601002632/http://messenger.msn.com/download/, downloaded Aug. 9, 2019, 1 pg.

MSN Messenger, "Most Frequently Asked Questions," https://web.archive.org/web/20050601014205/http://messenger.msn.com/Help/, downloaded Aug. 9, 2019, 8 pgs.

Schulzrinne, H. et al., RPID: Rich Presence Extensions to the Presence Information Data Format (PIDF), draft-ietf=simple-rpid-06.txt, Jun. 2, 2005, http://www1.ietf.org/mail-archive/web/simple/current/msg05398.html, downloaded Nov. 15, 2006, pp. 1-35.

Schulzrinne, H. et al., RPID: Rich Presence Extensions to the Presence Information Data Format (PIDF), draft-ietf-simple-rpid-10.txt, Dec. 20, 2005, pp. 1-41.

Schulzrinne, H. et al., RPID: Rich Presence Extensions to the Presence Information Data Format (PIDF), draft-ietf-simple-rpid-10.txt, Dec. 4, 2005, pp. 1-35.

Skype™, "Skype is free Internet telephony that just works," https://web.archive.org/web/20050601003206/http:/www.skype.com, downloaded Aug. 6, 2019, 3 pgs.

Skype™, "Skype is free Internet telephony that just works," https://web.archive.org/web/20050601003206/http:/www.skype.com/, downloaded Aug. 9, 2019, 21 pgs.

Skype™, "How to Use Skype," https://web.archive.org/web/20041229163311/http:/www.skype.com/help/guides/usingskype.html, downloaded Aug. 9, 2019, 6 pgs.

Skype™, "How to Add a Contact—User Guide," https://web.archive.org/web/20041230160101/http:/www.skype.com/help/guides/adduser. html, 10 pgs.

Skype™, "Registering a Skype Name—User Guide," https://web.archive.org/web/20041229042631/http:/www.skype.com/help/guides/registration.html, 10 pgs.

Sonim Technologies, Inc., "Integrated voice and text messanging over GPRS showcased jointly by Sonim, Symbian and Texas Instruments", Sonim Press Release, Dec. 2, 2002, pp. 1-2.

Symbian Ltd., "Symbian OS Version 7.0: Functional description", Revision 1.5, Feb. 2003, pp. 1-24.

Symbian Ltd., "Symbian OS Version 7.0s: Functional description", Revision 2.1, Jun. 2003, pp. 1-29.

Symbian Ltd., "Technology: Creating Symbian OS phones", http://www.symbian.com/technology/create-symb-OS-phones.html, downloaded Nov. 5, 2003, p. 1-8.

Symbian Ltd., "Technology: Why is a different operating system needed", http://www.symbian.com/technology/why-diff-os.html, downloaded Nov. 5, 2003, pp. 1-5.

Using AIM on Windows—Video IM, https://web.archive.org/web/20050307231707/http:/www.aim.com/help_faq/using/win/video_im.adp?aolp=, downloaded Aug. 9, 2019, 2 pgs.

Using AIM on Windows—Mar. 8, 2005, https://web.archive.org/web/20050308012857/http://www.aim.com/help_faq/using/win/aimtalk.adp?aolp=, downloaded Aug. 9, 2019, 2 pgs.

Using AIM on Windows—Mar. 5, 2005, https://web.archive.org/web/20050305095328/http:/www.aim.com:80/help_faq/using/win/instant_message.adp?aolp=, downloaded Aug. 9, 2019, 2 pgs.

Verizon Wireless, "TXT messaging", http://www.vtext.com/customer_site/jsp/messaging_lo.jsp, downloaded Oct. 2, 2003, p. 1.

W3C, Voice Extensible Markup Language (VoiceXML) Version 2.0, W3C, www.w3.org, Feb. 20, 2003.

Yahoo!Messenger, "Yahoo!Messenger Talk for Free!", http://messenger.yahoo.com/messenger/help/voicechat.html, downloaded Oct. 2, 2003, pp. 1-2.

"Yahoo! Messenger," https://web.archive.org/web/20050601012258/http:/messenger.yahoo.com, downloaded Aug. 6, 2019, 1 pg.

"Yahoo! Messenger," https://web.archive.org/web/20050601042101/http:/messenger.yahoo.com/newtoim.php, downloaded Aug. 9, 2019, 3 pgs.

"Yahoo! Help—All-New Messenger 6.0," https://web.archive.org/web/20040806142252/http://help.yahoo.com/help/us/messenger/win/abuse/abuse-02.html, downloaded Aug. 9, 2019, 2 pgs.

Notice of Allowance for U.S. Appl. No. 16/556,205, dated Feb. 25, 2020.

Petition for Inter Partes Review, U.S. Pat. No. 10,142,810, Case IPR2021-00202, filed Nov. 15, 2021, pp. 1-103.

Patent Owner's Preliminary Response Under 27 C.F.R. 42.107, Re Inter Partes Review, U.S. Pat. No. 10,142,810, Case No. IPR2022-00202, filed Feb. 28, 2022, pp. 1-30.

Petition for Inter Partes Review, U.S. Pat. No. 10,708,727, Case IPR2021-00291, filed Dec. 7, 2021, pp. 1-102.

Patent Owner's Preliminary Response Under 27 C.F.R. 42.107, Re Inter Partes Review, U.S. Pat. No. 10,708,727, Case No. IPR2022-00291, filed Mar. 18, 2022, pp. 1-29.

Petition for Inter Partes Review, U.S. Pat. No. 10,492,038, Case IPR2022-00294, filed Dec. 7, 2021, pp. 1-96.

Petitioner's Amended Exhibit List, Petition for Inter Partes Review, U.S. Pat. No. 10,492,038, Case IPR2022-00294, filed Dec. 14, 2021, pp. 1-5.

Patent Owner's Preliminary Response Under 27 C.F.R. 42.107, Re Inter Partes Review, U.S. Pat. No. 10,492,038, Case No. IPR2022-00294, filed Mar. 13, 2022, pp. 1-24.

Petition for Inter Partes Review, U.S. Pat. No. 10,492,038, Case IPR2021-00295, filed Dec. 7, 2021, pp. 1-99.

Patent Owner's Preliminary Response Under 27 C.F.R. 42.107, Re Inter Partes Review, U.S. Pat. No. 10,492,038, Case No. IPR2022-00295, filed Mar. 13, 2022, pp. 1-23.

Petition for Inter Partes Review, U.S. Pat. No. 8,744,407, Case IPR2021-00297, filed Dec. 8, 2021, pp. 1-85.

Patent Owner's Preliminary Response Under 27 C.F.R. 42.107, Re Inter Partes Review, U.S. Pat. No. 8,744,407, Case No. IPR2022-00297, filed Mar. 20, 2022, pp. 1-19.

Declaration of Dr. Kevin Almeroth in Support of Inter Partes Review, U.S. Pat. No. 10,142,810, Case IPR2021-00202, filed Nov. 15, 2021, pp. 1-153.

Declaration of Dr. Kevin Almeroth in Support of Inter Partes Review, U.S. Pat. No. 10,708,727 and U.S. Pat. No. 10,492,038, Case IPR2021-00294 filed Dec. 7, 2021; and U.S. Pat. No. 10,492,038, Case IPR2021-00295, filed Dec. 7, 2021, U.S. Pat. No. 8,744,407, Case IPR2021-00297, pp. 1-291.

(56) References Cited

OTHER PUBLICATIONS

Declaration of Dr. Kevin Almeroth in Support of Inter Partes Review, U.S. Pat. No. 8,744,407, Case IPR2021-00297, pp. 1-117.
Curriculum Vitae of Dr. Kevin Almeroth, Case IPR2021-00202, IPR2021-00291, IPR2021-00294, Case IPR2021-00295, Case IPR2021-00297, pp. 1-34.
*Ingenioshare, LLC* v. *Epic Games, Inc.*, IngenioShare's Preliminary Infringement Contentions, WDTX, CA No. 6:21-cv-00663-ADA, filed Sep. 16, 2021, pp. 1-3.
Bazaios, A., et al., Multimedia Architecture Offering Open Distance Learning Services over Internet, pp. 1-5.
Benimoff, M and Burns, M., Multimedia User Interfaces for Telecommunications Products and Services (1993), pp. 1-8.
Day, et al. Instant Messaging/Presence Protocol Requirements, Internet Engineering Task Force RFC 2779 (Instant Messaging/Presence Protocol Requirements) (2000), pp. 1-26.
Falconer, W. and Hooke, J., Telecommunications Services in the Next Decade (1986), pp. 1-16.
Grinter, R. and Phalen, L., Instant Messaging in Teen Life (2002), pp. 1-10.
Hernandez, R., ECPA and Online Computer Privacy (1988), pp. 1-27.
Hine, et al. An Adaptable User Interface to a Multimedia Telecommunications Conversation Service for People with Disabilities, Human Computer Interaction @IFIP International Federation for Information Processing 1995, pp. 1-4.
Kurose, J. and Ross, K., Computer Networking: A Top-Down Approach Feature the Internet (2000), pp. 1-73.
Kuehn, S., A Play Theory Analysis of Computer-Mediated Telecommunication (Apr. 20, 1990), pp. 1-16.
Miller, A., Ed. Applications of Computer Conferencing to Teacher Education and Human Resource Development, Proceedings from an International Symposium on Computer Conferencing (1991), pp. 1-82.
Patil, S. and Kobsa, A., The Challenges in Preserving Privacy in Awareness Systems, ISR Technical Report # UCI-ISR-03-3, (2003), pp. 1-9.
Stein, J., et al., Chat and Instant Messaging Systems, International Review of Research in Open and Distance Learning, vol. 3, No. 1, Apr. 2003, @ Jennifer Stein, Debbie Garber, John Baggalet, pp. 1-4.
Telecomputing in Japan, Database Promotion Center, Japan, LASIE vol. 17, No. 6, May/Jun. 1987, pp. 1-8.
Complaint for Patent Infringement (Exhibits A-H included), WDTX, CA No. 6:21-cv-00663, filed Jun. 25, 2021, pp. 1-185.
Epic Games Inc.'s Preliminary Invalidity Contentions, WDTX, CA No. 6:21-cv-00663-ADA, filed Nov. 11, 2021, pp. 1-71.
Exhibit A1 for Epic Games' Invalidity Contentions, WDTX, CA No. 6:21-cv-00663-ADA, filed Nov. 11, 2021, pp. 1-65.
Exhibit A2 for Epic Games' Invalidity Contentions, WDTX, CA No. 6:21-cv-00663-ADA, filed Nov. 11, 2021, pp. 1-52.
Exhibit A3 for Epic Games' Invalidity Contentions, WDTX, CA No. 6:21-cv-00663-ADA, filed Nov. 11, 2021, pp. 1-40.
Exhibit A4 for Epic Games' Invalidity Contentions, WDTX, CA No. 6:21-cv-00663-ADA, filed Nov. 11, 2021, pp. 1-65.
Exhibit A5 for Epic Games' Invalidity Contentions, WDTX, CA No. 6:21-cv-00663-ADA, filed Nov. 11, 2021, pp. 1-59.
Exhibit A6 for Epic Games' Invalidity Contentions, WDTX, CA No. 6:21-cv-00663-ADA, filed Nov. 11, 2021, pp. 1-113.
Exhibit A7 for Epic Games' Invalidity Contentions, WDTX, CA No. 6:21-cv-00663-ADA, filed Nov. 11, 2021, pp. 1-105.
Exhibit A8 for Epic Games' Invalidity Contentions, WDTX, CA No. 6:21-cv-00663-ADA, filed Nov. 11, 2021, pp. 1-74.
Exhibit A9 for Epic Games' Invalidity Contents, WDTX, CA No. 6:21-cv-00663-ADA, filed Nov. 11, 2021, pp. 1-67.
Exhibit A10 for Epic Games' Invalidity Contentions, WDTX, CA No. 6:21-cv-00663-ADA, filed Nov. 11, 2021, pp. 1-190.
Exhibit AA for Epic Games' Invalidity Contentions, WDTX, CA No. 6:21-cv-00663-ADA, Nov. 11, 2021, pp. 1-337.
Exhibit B1 for Epic Games' Invalidity Contentions, WDTX, CA No. 6:21-cv-00663-ADA, filed Nov. 11, 2021, pp. 1-132.
Exhibit B2 for Epic Games' Invalidity Contentions, WDTX, CA No. 6:21-cv-00663-ADA, filed Nov. 11, 2021, pp. 1-108.
Exhibit B3 for Epic Games' Invalidity Contentions, WDTX, CA No. 6:21-cv-00663-ADA, filed Nov. 11, 2021, pp. 1-108.
Exhibit B4 for Epic Games' Invalidity Contentions, WDTX, CA No. 6:21-cv-00663-ADA, filed Nov. 11, 2021, pp. 1-123.
Exhibit B5 for Epic Games' Invalidity Contentions, WDTX, CA No. 6:21-cv-00663-ADA, filed Nov. 11, 2021, pp. 1-108.
Exhibit B6 for Epic Games' Invalidity Contentions, WDTX, CA No. 6:21-cv-00663-ADA, filed Nov. 11, 2021, pp. 1-158.
Exhibit B7 for Epic Games' Invalidity Contentions, WDTX, CA No. 6:21-cv-00663-ADA, filed Nov. 11, 2021, pp. 1-193.
Exhibit B8 for Epic Games' Invalidity Contentions, WDTX, CA No. 6:21-cv-00663-ADA, filed Nov. 11, 2021, pp. 1-126.
Exhibit B9 for Epic Games' Invalidity Contentions, WDTX, CA No. 6:21-cv-00663-ADA, filed Nov. 11, 2021, pp. 1-134.
Exhibit B10 for Epic Games' Invalidity Contentions, WDTX, CA No. 6:21-cv-00663-ADA, filed Nov. 11, 2021, pp. 1-257.
Exhibit BB for Epic Games' Invalidity Contentions, WDTX, CA No. 6:21-cv-00663-ADA, filed Nov. 11, 2021, pp. 1-457.
Exhibit C1 for Epic Games' Invalidity Contentions, WDTX, CA No. 6:21-cv-00663-ADA, filed Nov. 11, 2021, pp. 1-73.
Exhibit C2 for Epic Games' Invalidity Contentions, WDTX, CA No. 6:21-cv-00663-ADA, filed Nov. 11, 2021, pp. 1-56.
Exhibit C3 for Epic Games' Invalidity Contentions, WDTX, CA No. 6:21-cv-00663-ADA, filed Nov. 11, 2021, pp. 1-50.
Exhibit C4 for Epic Games' Invalidity Contentions, WDTX, CA No. 6:21-cv-00663-ADA, filed Nov. 11, 2021, pp. 1-65.
Exhibit C5 for Epic Games' Invalidity Contentions, WDTX, CA No. 6:21-cv-00663-ADA, filed Nov. 11, 2021, pp. 1-65.
Exhibit C6 for Epic Games' Invalidity Contentions, WDTX, CA No. 6:21-cv-00663-ADA, filed Nov. 11, 2021, pp. 1-125.
Exhibit C7 for Epic Games' Invalidity Contentions, WDTX, CA No. 6:21-cv-00663-ADA, filed Nov. 11, 2021, pp. 1-105.
Exhibit C8 for Epic Games' Invalidity Contentions, WDTX, CA No. 6:21-cv-00663-ADA, filed Nov. 11, 2021, pp. 1-80.
Exhibit C9 for Epic Games' Invalidity Contentions, WDTX, CA No. 6:21-cv-00663-ADA, filed Nov. 11, 2021, pp. 1-83.
Exhibit C10 for Epic Games' Invalidity Contentions, WDTX, CA No. 6:21-cv-00663-ADA, filed Nov. 11, 2021, pp. 1-154.
Exhibit CC for Epic Games' Invalidity Contentions, WDTX, CA No. 6:21-cv-00663-ADA, filed Nov. 11, 2021, pp. 1-323.
Exhibit D1 for Epic Games' Invalidity Contentions, WDTX, CA No. 6:21-cv-00663-ADA, filed Nov. 11, 2021, pp. 1-40.
Exhibit D2 for Epic Games' Invalidity Contentions, WDTX, CA No. 6:21-cv-00663-ADA, filed Nov. 11, 2021, pp. 1-33.
Exhibit D3 for Epic Games' Invalidity Contentions, WDTX, CA No. 6:21-cv-00663-ADA, filed Nov. 11, 2021, pp. 1-27.
Exhibit D4 for Epic Games' Invalidity Contentions, WDTX, CA No. 6:21-cv-00663-ADA, filed Nov. 11, 2021, pp. 1-34.
Exhibit D5 for Epic Games' Invalidity Contentions, WDTX, CA No. 6:21-cv-00663-ADA, filed Nov. 11, 2021, pp. 1-34.
Exhibit D6 for Epic Games' Invalidity Contentions, WDTX, CA No. 6:21-cv-00663-ADA, filed Nov. 11, 2021, pp. 1-87.
Exhibit D7 for Epic Games' Invalidity Contentions, WDTX, CA No. 6:21-cv-00663-ADA, filed Nov. 11, 2021, pp. 1-77.
Exhibit D8 for Epic Games' Invalidity Contentions, WDTX, CA No. 6:21-cv-00663-ADA, filed Nov. 11, 2021, pp. 1-64.
Exhibit D9 for Epic Games' Invalidity Contentions, WDTX, CA No. 6:21-cv-00663-ADA, filed Nov. 11, 2021, pp. 1-54.
Exhibit D10 for Epic Games' Invalidity Contentions, WDTX, CA No. 6:21-cv-00663-ADA, filed Nov. 11, 2021, pp. 1-128.
Exhibit DD for Epic Games' Invalidity Contentions, WDTX, CA No. 6:21-cv-00663-ADA, filed Nov. 11, 2021, pp. 1-234.
Decision Granting Institution of Inter Partes Review, re Inter Partes Review U.S. Pat. No. 10,142,810, Case No. IPR2022-00202 entered May 23, 2022, pp. 1-74.
Declaration of Yimeng Dou, re Inter Partes Review U.S. Pat. No. 10,142,810, Case No. IPR2022-00202, dated Jun. 21, 2022, pp. 1-19.
Declaration of Jennifer A. Babbitt, re Inter Partes Review U.S. Pat. No. 10,142,810, Case No. IPR2022-00202, dated Jun. 21, 2022, pp. 1-46.

(56) References Cited

OTHER PUBLICATIONS

Supplemental Declaration of Dr. Kevin Almeroth, re Inter Partes Review U.S. Pat. No. 10,142,810, Case No. IPR2022-00202, dated Jun. 21, 2022, pp. 1-6.
Patent Owner's Response, re Inter Partes Review U.S. Pat. No. 10,142,810, Case No. IPR2022-00202, dated Aug. 12, 2022, pp. 1-79.
Declaration of Professor George N. Rouskas, Ph.D., re Inter Partes Review U.S. Pat. No. 10,142,810, Case No. IPR2002-00202, dated Aug. 12, 2022, pp. 1-82.
Decision Granting Institution of Inter Partes Review, Re Inter Partes Review U.S. Pat. No. 10,708,727, Case No. IPR2022-00291, entered May 24, 2022, pp. 1-36.
Declaration of Yimeng Dou, re Inter Partes Review U.S. Pat. No. 10,708,727, Case No. IPR2022-00291, dated Jun. 22 2022, pp. 1-19.
Declaration of Jennifer a. Babbitt, re Inter Partes Review U.S. Pat. No. 10,708,727, Case No. IPR2022-00291, dated Jun. 22 2022, pp. 1-47.
Supplemental Declaration of dr. Kevin Almeroth, re Inter Partes Review U.S. Pat. No. 10,708,727, Case No. IPR2022-00291, dated Jun. 22 2022, pp. 1-6.
Patent Owner's Response, re Inter Partes Review U.S. Pat. No. 10,708,727, Case No. IPR2022-00291, dated Aug. 12, 2022, pp. 1-79.
Declaration of Professor George N. Rouskas, Ph.D., re Inter Partes Review U.S. Pat. No. 10,708,727, Case No. IPR2002-00291, dated Aug. 12, 2022, pp. 1-83.
Decision Granting Institution of Inter Partes Review, re Inter Partes Review U.S. Pat. No. 10,492,038, Case No. IPR2022-00294, dated Jun. 7, 2022, pp. 1-75.
Decision Granting Institution of Inter Partes Review, re Inter Partes Review U.S. Pat. No. 10,492,038, Case No. IPR2022-00295, dated Jun. 7, 2022, pp. 1-74.
Decision Denying Institution of Inter Partes Review, Re Inter Partes Review U.S. Pat. No. 8,744,407, Case No. IPR2022-00297, entered May 26, 2022, pp. 1-27.
PAM Specification Document, Version 1.0 @The PAM Forum 2000-2001, Sep. 11, 2001, pp. 1-155.
Inter Partes Review, U.S. Pat. No. 10,142,810, Case IPR2021-00202, filed Nov. 15, 2021.
Inter Partes Review, U.S. Pat. No. 10,708,727, Case IPR2021-00291, filed Dec. 7, 2021.
Inter Partes Review, U.S. Pat. No. 10,492,038, Case IPR2022-00294, filed Dec. 7, 2021.
Inter Partes Review, U.S. Pat. No. 10,492,038, Case IPR2021-00295, filed Dec. 7, 2021.
Inter Partes Review, U.S. Pat. No. 8,744,407, Case IPR2021-00297, filed Dec. 8, 2021.
AIM, "Get AIM for Windows, New AIM 4.8 It's the Coolest AIM Ever!" last revised Jun. 1, 2002 (available at https://web.archive.org/web/20020601182525/http://www.aim.com/get_aim/win/latest_win.ad9?aol9erm=h), pp. 1-6.
AIM, "AOL Instant Messenger, Sign Up!" last revised Feb. 12, 2002 (available at https://web.archive.org/web/20020212115044/http://aim.aol.com/aimnew/newreg/register2.ad9?promo=208933), pp. 1.
AIM, "AIM Service Using Wireless Phones," last updated Jun. 2, 2002 (available at https://web.archive.org/web/20020602022534/http://www.aol.com:80/aim/wireless/index.htm), pp. 1.
AIM, "AOL Instant Messenger, Help/FAQs: Starting Out," last revised Jun. 1, 2002 (available at https://web.archive.org/web/20020601215842/http:/www.aim.com/help_faq/starting_out/g etstarted.adp?aolperm=h), pp. 1-2.
AIM, "AIM 5.9—Frequently Asked Questions," last revised Dec. 14, 2004 (available athttps://web.archive.org/web/20041204191853/http://www.aim.com/help_faq/starting_out/getstarted.adp?aolp=), pp. 1-2.
AIM, "Download AIM for Windows," last revised Oct. 27, 2004 (available at https://web.archive.org/web/20041027124158/http://channels.netscape.com/wrap/linker.js p?floc=at_nav_20_1a&ref=http://www.aim.com/get_aim/win/latest_win.adp?aolp=), pp. 1-2.
AIM, "Online Safety/Security FAQ," last revised Aug. 23, 2004 (available at https://web.archive.org/web/20040823225049/http://www.aim.com/help_faq/security/faq.a d9?aolp=), pp. 1-3.
AIM, "Instant Messenger 3.0," last revised Mar. 4, 2000 (available at https://web.archive.org/web/20000304005637/http://aol.com/aim/aim30.html), pp. 1.
AIM, "Help/FAQS: Starting Out," last revised Dec. 9, 2001 (available at https://web.archive.org/web/20011209034619/http://www.aim.com/help_faq/starting_out/installation.adp?aolperm=). pp. 1-2.
AIM, "Help/FAQs: Using AIM," last revised Feb. 3, 2002 (available at https://web.archive.org/web/20020203120948/htt9://www.aim.com/help_faq/using/aimtalk.adp?aolperm=), pp. 1-3.
AIM, "Help/FAQs: Using AIM," last revised Feb. 3, 2002 (available at https://web.archive.org/web/20020203120707/http://www.aim.com/help_faq/using/buddylist.adp?aolperm=), pp. 1-3.
AIM, "Help/FAQs: Using AIM, Buddy Alerts," last revised Dec. 9, 2001 (available at https://web.archive.org/web/20011208221312/http://www.aim.com/help_faq/using/buddyalerts.adp?aolperm=), pp. 1.
AIM, "Help/FAQs: Using AIM, Chat," last revised Feb. 3, 2002 (available at https://web.archive.org/web/20020203120743/http://www.aim.com/help_faq/using/chat.adp?aolperm=), pp. 1.
AIM, "Help/FAQs: Using Aim, 'I'm Away' Message," last revised Feb. 3, 2002 (available at https://web.archive.org/web/20020203120132/http://www.aim.com/help_faq/using/away.adp?aolperm=), pp. 1-2.
AIM, "Help/FAQs: Using AIM, Sounds," last revised Feb. 4, 2002 (available at https://web.archive.org/web/20020204061312/http://www.aim.com/help_faq/using/sounds.adp?aolperm=), p. 1.
AIM, "Help/FAQs: Using Aim, Warnings," last revised Feb. 4, 2002 (available at https://web.archive.org/web/20020204063408/http://www.aim.com/help_faq/using/warning s.adp?aolperm=), pp. 1-2.
AIM, "Help/FAQs: Using AIM, Instant Messages," last revised Dec. 9, 2001 (available at https://web.archive.org/web/20011209000946/http://www.aim.com/help_faq/using/instant_message.adp?aolperm=), pp. 1.
AIM, "Help/FAQs: Advanced Tips, Email," last revised Dec. 8, 2001 (available at https://web.archive.org/web/20011208185208/http://www.aim.com/help_faq/advanced/email.adp?aolperm=), pp. 1.
AIM, "Help/FAQs: Starting Out," last revised Feb. 5, 2002 (available at https://web.archive.org/web/20020205150112/http://www.aim.com/help_faq/starting_out/registration.adp?aolperm=), pp. 1-2.
AIM, "What's New, New on AOL," last revised Apr. 21, 1997 (available at https://web.archive.org/web/19970421165557/http:/www.aol.com:80/new), pp. 1-3.
Blizzard Entertainment, "Diablo II Ships Worldwide," last revised Sep. 1, 2000 (available at https://web.archive.org/web/20000901001148/http://www.blizzard.com/PRESS/000628.shtml), pp. 1-2.
Blizzard Entertainment, "Blizzard Entertainment Announces World Of Warcraft "Street Date" - Nov. 23, 2004," last revised Nov. 23, 2004 (available at https://web.archive.org/web/20041123014425/http://www.blizzard.com/press/040411-street-date.shtml), pp. 1-2.
Businessfleet, "Personity and Motorola Announce Intent to Provide Wireless Presence and Instant Messaging," last revised Mar. 20, 2001 (available at https://www.businessfleet.com/9180/personity-and-motorola-announce-intent-to-provide- wireless-presence-and-instant-messaging), pp. 1-3.
ICQ, "ICQ Tour—Welcome," last revised Nov. 18, 2004 (available at https://web.archive.org/web/20041118054212/http:/www.icq.com/icqtour/index.html), pp. 1-2.
ICQ, "ICQ Tour—Chat Features and Tips," last revised Oct. 22, 2004 (available at https://web.archive.org/web/20041022023143/http:/www.icq.com/icqtour/chatfeature.html) , pp. 1-5.
ICQ, "ICQ Pro Tour—Adding Users," last revised Oct. 23, 2004 (available at https://web.archive.org/web/20041023030403/http://www.icq.com/icqtour/advanced/index.html), pp. 1-3.
ICQ, "Security and Privacy Center—Ignore Users & Events," last revised Oct. 19, 2004 (available at https://web.archive.org/web/20041019003105/http:/www.icq.com/support/security/ignore.html), pp. 1-3.

(56) References Cited

OTHER PUBLICATIONS

ICQ, "Security and Privacy Center—Hide/Display Your Details," last revised Oct. 27, 2004 (available at https://web.archive.org/web/20041027022205/http:/www.icq.com/support/security/user.html), pp. 1-4.

ICQ, "Telephony Center—Internet Telephony," last revised Nov. 26, 2004 (available at https://web.archive.org/web/20041126040911/http:/www.icq.com/telephony/telephony.html), pp. 1.

ICQ, "PDA Center—Download ICQ for PDA," last revised Nov. 30, 2004 (available at https://web.archive.org/web/20041130015216/http:/www.icq.com/pda), pp. 1.

ICQ, "ICQ Pro Help Center—2-Way Sms," last revised Nov. 29, 2004 (available at https://web.archive.org/web/20041129022721/http:/web.icq.com/help/quickhelp/11739,0 0.html), pp. 1-2.

ICQ, "ICQ Phone—Use your ICQ to call anyone, anywhere around the world!" last revised Nov. 12, 2004 (available at https://web.archive.org/web/20041112041719/http://www.icq.com/icqphone), pp. 1.

ICQ, "Pc to Phone," last revised Nov. 12, 2004 (available at https://web.archive.org/web/20041112071152/http://icqphone.icq.com/icq2phone), pp. 1.

ICQ, "Pc-to-Phone call using ICQphone," last revised Nov. 13, 2004 (available at https://web.archive.org/web/20041113094347/http://icqphone.icq.com/hows/pc2phonecall.html), pp. 1-2.

ICQ, "ICQ Pro Tour—Status, Web Search," last revised Oct. 22, 2004 (available at https://web.archive.org/web/20041022023223/http://www.icq.com/icqtour/advanced/system.html), pp. 1-3.

ICQ, "Security and Privacy Center —Set Your Availability," last revised Apr. 4, 2004 (available at https://web.archive.org/web/20040404043535/http://www.icq.com/support/security/availability.html), pp. 1-6.

ICQ, "Press Release, I Seek You," last revised Feb. 24, 1998 (available at https://web.archive.org/web/19980224005353/http:/www.icq.com/press release2.html), pp. 1-3.

MSN, "MSN Messenger Service Features," last revised Aug. 15, 2000 (available at https://web.archive.org/web/20000815054701/http:/messenger.msn.com/support/features.asp), pp. 1-2.

MSN, "Take a Tour," last revised Dec. 3, 2003 (available at https://web.archive.org/web/20031203160637/http://messenger.msn.com/Tour), pp. 1-3.

MSN, "Frequently Asked Questions," last revised Aug. 16, 2000 (available at https://web.archive.org/web/20000816043736/http://messenger.msn.com/support/faq.asp, pp. 1-14.

MSN, "MSN Messenger for Windows," last revised Jun. 27, 2003 (available at https://web.archive.org/web/20030627210049/http://messenger.msn.com/support/features.asp?client=1), pp. 1-3.

MSN, "MSN Messenger for Windows," last revised Apr. 17, 2003 (available at https://web.archive.org/web/20030417042941/http://messenger.msn.com/support/features2.asp?client=1), pp. 1-2.

MSN, "MSN Messenger for Windows," last revised Feb. 14, 2003 (available at https://web.archive.org/web/20030214154139/http://messenger.msn.com/support/features3.asp?client=1), pp. 1-2.

MSN, "MSN Messenger Service News," last revised Feb. 29, 2000 (available at https://web.archive.org/web/20000229041141/http://messenger.msn.com/support/news.asp), pp. 1-2.

Nokia, "Nokia Presence Server," last revised Nov. 21, 2002 (available at https://web.archive.org/web/20021121115823/http:/www.nokia.com:80/networks/product_ catalog/pc_product_highlights/1,5567,,00.html?prod_id=MIA000 35&path=ann), pp. 1.

Nokia, "Presence—the new dimension to staying in touch," last revised Mar. 23, 2003 (available at https://web.archive.org/web/20030323204241/http:/www.nokia.com/pc_files_wb2/Presence.pdf), pp. 1-2.

Nokia, "Nokia Presence Server," last revised Dec. 16, 2002 (available at https://web.archive.org/web/20021216235001/http:/www.nokia.com/networks/product_cat alog/pc_product_faq/1,5565,,00.html?prod_id=MIA00035&path= ann&mcat=&scat=&tech_id=&range_id=&query=), pp. 1-2.

Openwave, "Openwave and Cisco to Build VoiceXML-Based Unified Communications Architecture," last revised Aug. 8, 2004 (available at https://web.archive.org/web/20040808011252/http://www.openwave.com/US/news_room/press_releases/2001/20010131_cisco_0131.htm), pp. 1-2.

Openwave, "Instant Messaging Client," last revised Apr. 7, 2005 (available at https://web.archive.org/web/20050407083838/http:/www.openwave.com/us/products/device_products/instant_messaging_client), pp. 1-2.

Openwave, "Openwave Video Voicemail," last revised Dec. 13, 2004 (available at https://web.archive.org/web/20041213234345/http:/www.openwave.com/us/products/wireline/video_voicemail), pp. 1-2.

Openwave, "Openwave Email Mx," last revised Apr. 2003 (available at https://web.archive.org/web/20031207184319/http:/www.openwave.com/docs/products/email_mx/email_mx.pdf), pp. 1-2.

Openwave, "Openwave Email Mx," last revised Jun. 26, 2001 (available at https://web.archive.org/web/20010626005531/http:/www.openwave.com/products/comm_services/email_mx/index.html), pp. 1-2.

Openwave, "Openwave Mobile Messaging Client," last revised Aug. 4, 2004 (available at https://web.archive.org/web/20040804221708/http:/www.openwave.com/us/products/mobi le/device_products/mobile_messaging_client/index.htm), pp. 1-2.

Openwave, "Openwave Multimedia Messaging Service Center," last revised Aug. 4, 2004 (available at https://web.archive.org/web/20040804131649/http://www.openwave.com/us/products/mob ile/operator_products/multimedia_messaging_service_center/index.htm), pp. 1-2.

Skype, "Skype is the new Must-Have Application," last revised Sep. 1, 2004 (available at https://web.archive.org/web/20040901060537/http:/www.skype.com/skype.html), pp. 1-2.

Skype, "User Guide," last revised Sep. 1, 2004 (available at https://web.archive.org/web/20040901011045/http:/www.skype.com/help_userguide.html), pp. 1-5.

Skype, "Frequently Asked Questions," last revised Aug. 31, 2004 (available at https://web.archive.org/web/20040831234713/http:/www.skype.com/help_faq.html), pp. 1-12.

Skype, "Skype for Pocket PC—Taking Free Calling Mobile," last revised Aug. 27, 2004 (available at https://web.archive.org/web/20040827025846/http://www.skype.com/download_pda.html), pp. 1-2.

Skype, "USB Phone Drivers," last revised Aug. 26, 2004 (available at https://web.archive.org/web/20040826073747/http://www.skype.com/download_drivers.html), p. 1.

Skype, "How to Use Skype," last revised Dec. 31, 2004 (available at https://web.archive.org/web/20041231012559/http://www.skype.com/help/guides/usingskype.html), pp. 1-6.

Skype, "How to Use Skype Chat," last revised Dec. 29, 2004 (available at https://web.archive.org/web/20041229212009/http://www.skype.com/help/guides/chat.html), 1-7.

Skype, "Skype is free Internet telephony that just works," last revised Dec. 30, 2004 (available at https://web.archive.org/web/20041230034113/http://skype.com:80), pp. 1-3.

Skype, "Skype is free Internet telephony that just works," last revised Dec. 30, 2004 (available at https://web.archive.org/web/20041230090353/http://skype.com/), pp. 1-3.

Skype, "Skype is free Internet telephony that just works," last revised Dec. 30, 2004 (available at https://web.archive.org/web/20041230090353/http://skype.com:80), pp. 1-3.

Skype, "Hello. We're Skype and we've got something we would like to share with you," last revised Dec. 30, 2004 (available at https://web.archive.org/web/20041230034337/http://www.skype.com:80/products), pp. 1-3.

Skype, "SkypeOut," last revised Dec. 30, 2004 (available at https://web.archive.org/web/20041230052712/http://www.skype.com/products/skypeout), pp. 1-2.

Skype, "Skype for Pocket Pc," last revised Dec. 30, 2004 (available at https://web.archive.org/web/20041230044043/http://www.skype.com/products/skype/pocketpc), pp. 1.

Skype, "Skype Screenshots," last revised Dec. 4, 2004 (available at https://web.archive.org/web/20041204144641 /http://skype.com/products/screenshots.html?os=pocketpc), pp. 1.

(56) References Cited

OTHER PUBLICATIONS

Skype, "Skype," last revised Aug. 11, 2003 (available at https://web.archive.org/web/20030811075825/http://www.skype.com:80/skype.html), pp. 1-2.
Trillian, "Version 0.63," last revised Oct. 31, 1991 (available at https://web.archive.org/web/20040808011252/http:/www.openwave.com/us/news_room/press_releases/2001/20010131_cisco_0131.htm), pp. 1-2.
Trillian, "What Trillian Is," last revised Feb. 4, 2003 (available at https://web.archive.org/web/20030204062930/http:/www.trillian.cc/help/sec-1.php?hchap=1&hsub=1), pp. 1-3.
Trillian, "Understanding Message Windows," last revised Feb. 4, 2003 (available at https://web.archive.org/web/20030204062655/http://www.trillian.cc/help/sec-1.php?hchap=3&hsub=3), pp. 1-2.
Trillian, "What You'll Need," last revised Dec. 5, 2002 (available at https://web.archive.org/web/20021205182516/http://www.trillian.cc/help/sec-1.php?hchap=1&hsub=1&hsect=3), pp. 1-2.
Trillian, "Understanding Containers," last revised Feb. 4, 2003 (available at https://web.archive.org/web/20030204063332/http://www.trillian.cc/help/sec-1.php?hchap=3&hsub=5), pp. 1-3.
Trillian, "Installing for the First Time," last revised Feb. 4, 2003 (available at https://web.archive.org/web/20030204064229/http://www.trillian.cc/help/sec-1.php?hchap=2&hsub=2&hsect=1), pp. 1-2.
Trillian, "Preventing New Message Windows from Popping Up," last revised Dec. 16, 2002 (available at https://web.archive.org/web/20021216033123/http://www.trillian.cc/help/sec-1.php?hchap=10&hsub=8), pp. 1-2.
Trillian, "Ensuring Your Privacy," last revised Dec, 12, 2002 (available at https://web.archive.org/web/20021216030809/http://www.trillian.cc/help/sec-1.php?hchap=10&hsub=3), pp. 1-3.
Trillian, "Adding a Contact," last revised Dec. 16, 2002 (available at https://web.archive.org/web/20021216032347/http://www.trillian.cc/help/sec-1.php?hchap=10&hsub=1), pp. 1-2.
Trillian, "How to Use Containers," last revised Dec. 16, 2002 (available at https://web.archive.org/web/20021216030128/http://www.trillian.cc/help/sec1.php?hchap= 10&hsub=9), pp. 1-2.
Trillian, "Advanced Auto-Status Changes," last revised Feb. 4, 2003 (available at https://web.archive.org/web/20030204054657/http://www.trillian.cc/help/sec-1.php?hchap=10&hsub=10), pp. 1-2.
Ventrilo, "Ventrilo: Scalable Voice Comm," last revised Dec. 13, 2002 (available at https://web.archive.org/web/20021213231549/http:/www.ventrilo.com/index.html), pp. 1.
Ventrilo, "About," last revised Dec. 13, 2002 (available at https://web.archive.org/web/20021213231120/http:/www.ventrilo.com:80/about.html), pp. 1-3.
Ventrilo, "MyIP," last revised Dec. 4, 2004 (available at https://web.archive.org/web/20041204022621/http://www.ventrilo.com/myip.php), pp. 1.
Ventrilo, "Setup," last revised Nov. 29, 2004 (available at https://web.archive.org/web/20041129013532/http://www.ventrilo.com/setup.php), pp. 1-6.
Ventrilo, "FAQ," last revised Feb. 2, 2004 (available at https://web.archive.org/web/20040202021343/http://www.ventrilo.com:80/faq.php), pp. 1-7.
Ventrilo, "About," last revised Nov. 11, 2004 (available at https://web.archive.org/web/20041108035817/http://www.ventrilo.com/about.php), pp. 1-4.
Ventrilo, "Applications," last revised Nov. 30, 2004 (available at https://web.archive.org/web/20041130031726/http://www.ventrilo.com/applications.php), pp. 1.
Xbox, "Xbox Live Arrives in Stores, Sparking the Next Revolution in Video Games," last revised Nov. 15, 2002 (available at https://news.microsoft.com/2002/11/15/xbox-live-arrives-in-stores-sparking-the-next- revolution-in-video-games), pp. 1-10.
Xbox, "About Xbox Live," last revised Oct. 1, 2004 (available at https://web.archive.org/web/20041001022258/http:/www.xbox.com/en- US/Live/about/default.htm), pp. 1-2.
Xbox, "How to Use Voice," last revised Oct., 10, 2004 (available at https://web.archive.org/web/20041010172258/http:/www.xbox.com/en- us/live/about/guidevoice.htm), pp. 1-3.
Xbox, "Xbox Live Icon," last revised Oct. 10, 2004 (available at https://web.archive.org/web/20041010114752/http://www.xbox.com/en- us/live/about/guide-icons.htm), pp. 1-2.
Xbox, "How to Use Xbox Live voice Messaging," last revised Oct. 10, 2004 (available at https://web.archive.org/web/20041010022522/http://www.xbox.com/en- us/live/about/guidevoicemessaging.htm), pp. 1-2.
Microsoft, "Xbox Wireless Adapter MN-740," last revised Feb. 25, 2004 (available at https://web.archive.org/web/20040225023931/http://www.microsoft.com/hardware/broadb andnetworking/productdetails.aspx?pid=015), pp. 1.
Xbox, "A Newcomer's Guide to Xbox Live," last revised Oct. 2, 2003 (available at https://web.archive.org/web/20031002012937/http://www.xbox.com/en- us/live/about/Features-IntroToXboxLive.htm), pp. 1.
Xbox, "Connect 1 2 3," last revised Oct. 2, 2003 (available at https://web.archive.org/web/20031002014510/http://www.xbox.com/en- us/live/connect/default.htm).
Xbox, "Choose a Connection," last revised Oct. 3, 2003 (available at https://web.archive.org/web/20031003072336/http://www.xbox.com/en-us/live/connect/choose.htm).
Xbox, "Account Creation," last revised Oct. 2, 2003 (available at https://web.archive.org/web/20031002015246/http://www.xbox.com/en- US/live/accounts/YourAccount_Setup.htm).
Xbox, "Features-Friends," last revised Sep. 27, 2004 (available at https://web.archive.org/web/20040927001607/http://www.xbox.com/en- US/live/about/features-friends.htm).
Xbox, "Features-Voice," last revised Oct. 10, 2004 (available at https://web.archive.org/web/20041010013840/http://www.xbox.com/en- US/live/about/features-voice.htm).
Xbox, "Features-Gamertags," last revised Oct. 3, 2003 (available at https://web.archive.org/web/20031003063104/http://www.xbox.com/en- US/live/about/Features-Gamertags.htm).
Xbox, "Xbox Instruction Manual," last revised Feb. 5, 2004 (available at https://web.archive.org/web/20040205045738/http://www.xbox.com/assets/en- US/HardwareManuals/Console_Ins_Manual.pdf), pp. 1-64.
Xbox, "You Asked for It, You Got It: Voice Messaging," last revised Oct. 10, 2004 (available at https://web.archive.org/web/20041010014328/http://www.xbox.com/en- US/live/about/features-voicemessaging.htm).
Xbox, "10 Tips for More Fun on Xbox Live," last revised Sep. 25, 2003 (available at https://web.archive.org/web/20030925063548/http:/www.xbox.com/en- US/live/about/About-10TipsMoreFun.htm).
Yahoo!, "Yahoo! Messenger—Windows Version Help," last revised Apr. 1, 2004 (available at https://web.archive.org/web/20040401230900/http://help.yahoo.com/help/US/mesg/use/US e-38.html), pp. 1.
Yahoo!, "Instantly communicate with all of your online friends," last revised Mar. 21, 2004 (available at https://web.archive.org/web/20040421201703/http:/www.yahoo.com/_ylh=X30DMTB1c2ZmZzF2BF9TAzI3MTYxNDKEdGVzdAMwBHRtcGwDbnMtYmVOYQ -- /r/p1), pp. 1.
Yahoo!, "Yahoo! Messenger," last revised Sep. 3, 2004 (available at https://web.archive.org/web/20040903130452/http://US.rd.yahoo.com/messenger/home_q d/?http://messenger.yahoo.com/messenger/download/dinstructions. html), pp. 1.
Yahoo!, "The all-new Yahoo Messenger," last revised Sep. 25, 2004 (available at https://web.archive.org/web/20040925202102/http://rd.yahoo.com/SIG=128jj4fqa/M=2515 21.4144277.5354673.1964910/D=pager/S=96454135:HEAD/EXP=1082657224/A=18485 30/R=6/*http://messenger.yahoo.com), pp. 1.
Yahoo!, "Have a question about Yahoo! Messenger?" last revised May 21, 2004 (available at https://web.archive.org/web/20040521214943/http://US.rd.yahoo.com/messenger/home_he lp/?http://help.yahoo.com/help/mesg/index.html), pp. 1.
Yahoo!, "Talk for Free!" last revised Jun. 3, 2004 (available at https://web.archive.org/web/20040603054211/http://messenger.yahoo.com/messenger/he lp/voicechat.html), pp. 1-2.
Yahoo!, "Audibles," last revised Dec. 11, 2004 (available at https://web.archive.org/web/20041211003201/http://messenger.yahoo.com:80/audiblesho menf.php) pp. 1.

(56) References Cited

OTHER PUBLICATIONS

Yahoo!, "Emoticons," last revised Nov. 8, 2004 (available at https://web.archive.org/web/20041108091317/http://messenger.yahoo.com:80/emoticons. php), pp. 1-2.
Yahoo!, "New to Instant Messaging?" last revised Oct. 14, 2004 (available at https://web.archive.org/web/20041014074520/http://messenger.yahoo.com/newtoim.php), pp. 1-3.
Yahoo!, "All-New Messenger 6.0 Help," last revised Sep. 9, 2004 (available at https://web.archive.org/web/20040909104127/http://help.yahoo.com/help/US/messenger/win/im/im-11.html), pp. 1.
Yahoo!, "How do I start a voice conversation in an IM window?" last revised Oct. 13, 2004 (available at https://web.archive.org/web/20041013140126/http://help.yahoo.com/help/US/messenger/win/im/im-14.html), pp. 1.
Yahoo!, "How do I use the Photos button?" last revised Dec. 11, 2004 (available at https://web.archive.org/web/20041211112426/http://help.yahoo.com/help/US/messenger/win/im/im-06.html), pp. 1.
Yahoo!, "How do I receive and reply to instant messages?" last revised Dec. 2, 2001 (available at https://web.archive.org/web/20011202101435/http://help.yahoo.com/help/US/mesg/use/us e-02.html), pp. 1.
Yahoo!, "Buzzing a Friend," last revised Dec. 14, 2001 (available at https://web.archive.org/web/20011214025715/http://help.yahoo.com/help/US/mesg/use/us e-34.html), pp. 1.
Yahoo!, "What do I need to use Yahoo! Messenger?" last revised Aug. 3, 2004 (available at https://web.archive.org/web/20040803173140/http://help.yahoo.com/help/us/mesg/mesg-02.html), pp. 1.
Yahoo!, "What is a Friend List?" last revised Sep. 19, 2004 (available at https://web.archive.org/web/20040919235327/http://help.yahoo.com/help/us/mesg/use/us e-10.html), pp. 1.
Yahoo!, "How do I add new friends to my list?" last revised Aug. 3, 2004 (available at https://web.archive.org/web/20040803205511/http://help.yahoo.com/help/us/mesg/use/us e-03.html), pp. 1.
Yahoo!, "How do I block or ignore an individual?" last revised Aug. 3, 2004 (available at https://web.archive.org/web/20040803210732/http://help.yahoo.com/help/us/mesg/use/us e-05.html), pp. 1.
Yahoo!, "What are identities (aliases) and profiles?" last revised Aug. 4, 2004 (available at https://web.archive.org/web/20040804034030/http://help.yahoo.com/help/us/mesg/use/us e-13.html), pp. 1-2.
Yahoo!, "How do I find other people to talk to?" last revised Aug. 3, 2004 (available at https://web.archive.org/web/20040803174336/http://help.yahoo.com/help/US/mesg/mesg- 05.html), pp. 1-2.
Yahoo!, "What is Invisible Mode?" last revised Nov. 29, 2001 (available at https://web.archive.org/web/20011129035100/http://help.yahoo.com/help/US/mesg/use/US e-29.html), pp. 1.
Yahoo!, "Status Icons/Messages," last revised Sep. 28, 2004 (available at https://web.archive.org/web/20040928085203/http://help.yahoo.com/help/US/mesg/use/US e-12.html), pp. 1-2.
Yahoo!, "What is PC to Phone?" last revised Sep. 16, 2004 (available at https://web.archive.org/web/20040916080317/http://help.yahoo.com/help/US/mesg/phone/ phone-02.html), pp. 1.
Yahoo!, "Feature overview," last revised Sep. 2, 2004 (available at https://web.archive.org/web/20040902014935/http://messenger.yahoo.com/messenger/wi reless/pc2sms/tour1.html), pp. 1.
Yahoo!, "Starting a mobile conversation," last revised Sep. 16, 2004 (available at https://web.archive.org/web/20040916023705/http://messenger.yahoo.com/messenger/wireless/pc2sms/tour2.html), pp. 1.
Yahoo!, "Responding to a message on the phone," last revised Oct. 14, 2004 (available at https://web.archive.org/web/20041014021507/http://messenger.yahoo.com/messenger/wireless/pc2sms/tour5.html), pp. 1.
Yahoo!, "Adding a friend to your Mobile Friends list," last revised Oct. 14, 2004 (available at https://web.archive.org/web/20041014072451/http://messenger.yahoo.com/messenger/wireless/pc2sms/tour3.html), pp. 1.
Yahoo, "Press Release, Stay in Touch with Yahoo! Pager," last revised Dec. 20, 2010 (available at https://web.archive.org/web/20101220214553/http:/yhoo.client.shareholder.com/press/releasedetail.cfm?ReleaseID=173501), pp. 1-2.
Petitioner's Reply to Patent Owner's Response, re Inter Partes Review U.S. Pat. No. 10,142,810, Case No. IPR2022-00202, dated Nov. 11, 2022, pp. 1-40.
Patent Owner's Sur-Reply, re Inter Partes Review U.S. Pat. No. 10,142,810, Case No. IPR2022-00202, dated Dec. 23, 2022, pp. 1-32.
Petitioner's Reply to Patent Owner's Response, re Inter Partes Review U.S. Pat. No. 10,708,727, Case No. IPR2022-00291, dated Nov. 11, 2022, pp. 1-40.
Patent Owner's Sur-Reply, re Inter Partes Review U.S. Pat. No. 10,708,727, Case No. IPR2022-00291, dated Dec. 23, 2022, pp. 1-32.
Patent Owner's Response Under 37 C.F.R. 42.120, re Inter Partes Review, U.S. Pat. No. 10,492,038, Case No. IPR2022-00294, dated Aug. 31, 2022, pp. 1-46.
Petitioner's Reply to Patent Owner's Response, re Inter Partes Review U.S. Pat. No. 10,492,038, Case No. IPR2022-00294, dated Nov. 23, 2022, pp. 1-30.
Patent Owner's Sur-Reply, re Inter Partes Review U.S. Pat. No. 10,492,038, Case No. IPR2022-00294, dated Jan. 4, 2023, pp. 1-35.
Patent Owner's Response Under 37 C.F.R. 42.120, re Inter Partes Review, U.S. Pat. No. 10,492,038, Case No. IPR2022-00295, dated Aug. 31, 2022, pp. 1-56.
Petitioner's Reply to Patent Owner's Response, re Inter Partes Review U.S. Pat. No. 10,492,038, Case No. IPR2022-00295, dated Nov. 23, 2022, pp. 1-35.
Patent Owner's Sur-Reply, re Inter Partes Review U.S. Pat. No. 10,492,038, Case No. IPR2022-00295, dated Jan. 4, 2023, pp. 1-34.
Epic Games' Demonstratives, *Epic Games, Inc.*, v. *IngenioShare, LLC*, re Inter Partes Review, U.S. Pat. No. 10,142,810, Case No. IPR2022-00202 and U.S. Pat. No. 10,708,727, Case No. IPR2022-00291, filed Feb. 17, 2023, pp. 1-71.
Oral Argument IPR2022-00202 & IPR2022-00291, Patent Owner's Demonstrative Exhibit, *Epic Games, Inc.*, v. *IngenioShare, LLC*, re Inter Partes Review, U.S. Pat. No. 10,142,810, Case No. IPR2022-00202 and U.S. Pat. No. 10,708,727, Case No. IPR2022-00291, filed Feb. 10, 2023, pp. 1-113.
Final Written Decision Determining No Challenged Claims Unpatentable, re Inter Partes Review U.S. Pat. No. 10,142,810, Case No. IPR2022-00202, dated May 19, 2023, pp. 1-62.
Final Written Decision Determining No Challenged Claims Unpatentable, re Inter Partes Review U.S. Pat. No. 10,708,727, Case No. IPR2022-00291, dated May 19, 2023, pp. 1-66.
Final Written Decision Determining No Challenged Claims Unpatentable, re Inter Partes Review U.S. Pat. No. 10,492,038, Case No. IPR2022-00294, dated May 19, 2023, pp. 1-62.
Final Written Decision Determining No Challenged Claims Unpatentable, re Inter Partes Review U.S. Pat. No. 10,492,038, Case No. IPR2022-00295, dated May 19, 2023, pp. 1-64.

\* cited by examiner

| ICM | | Default |
|---|---|---|
| 1 | Mobile phone | Voice mail |
| 2 | Office phone | Voice mail |
| 3 | Home phone | Voice mail |
| 4 | Mobile SMS/pager from mobile phone or PDA | Email |
| 5 | Home/office SMS (to office/home PC) | Email |
| 6 | Mobile Online chat (to mobile phone or PDA) | Voice mail |
| 7 | Home Online chat (Net Meeting, AOL, ICQ etc.) | Voice mail |
| 8 | Voice mail with instant notification to mobile devices of the user | |
| 9 | Voice mail without notification to mobile devices | |
| 10 | Office fax | |
| 11 | Home fax | Reject |
| 12 | Mobile Email (Blackberry etc.) | Email |
| 13 | Email | Reject |
| 14 | User defined | |

FIGURE 1

| ContactClass1 | Kinship family members, love ones |
|---|---|
| ContactClass2 | Relatives and friends |
| ContactClass3 | Boss and VIP |
| ContactClass4 | Colleagues |
| ContactClass5 | Subordinates |
| ContactClass6 | Business acquaintances |
| ContactClass7 | VIP Clients |
| ContactClass8 | Clients |
| ContactClass9 | Secretary |
| ContactClass10 | User defined |

FIGURE 2

| UrgClass1 | Life threatening – interrupt at any time and occasion |
|---|---|
| UrgClass2 | Urgent confirmed meeting reminder – interruption allowed |
| UrgClass3 | Urgent matter requiring immediate attention |
| UrgClass4 | Important matter requiring quick attention |
| UrgClass5 | Regular work related matter |
| UrgClass6 | Casual contact |
| UrgClass7 | Cold calls from unknown person |
| UrgClass8 | User defined |

FIGURE 3

| MyBusyState1 | Important meeting |
|---|---|
| MyBusyState2 | Ordinary meeting |
| MyBusyState3 | Available |
| MyBusyState4 | Sleeping |
| MyBusyState5 | Resting |
| MyBusyState6 | User defined |

FIGURE 4

| ContactClass | UrgClass | MyBusyState | ICM allowed |
|---|---|---|---|
| ContactClass2 | UrgClass1-3 | All | All |
| | UrgClass4-6 | MyBusyState1 | All |
| | | MyBusyState2-3 | All |
| | | MyBusyState4-5 | All |
| | UrgClass7-8 | All | ICM 13 |

FIGURE 5

METHOD AND APPARATUS TO MANAGE COMMUNICATION

CROSS-REFERENCE TO RELATED APPLICATIONS

This application is a continuation of U.S. patent application Ser. No. 16/556,205, filed Aug. 29, 2019, now U.S. Pat. No. 10,708,727, and entitled "METHOD AND APPARATUS TO MANAGE MESSAGING PROVIDING DIFFERENT COMMUNICATION MODES USING ONE IDENTIFIER AND NOT REQUIRING TO DISCLOSE CONTACT INFORMATION," which is hereby incorporated herein by reference, which application is a continuation of U.S. patent application Ser. No. 15/704,181, filed Sep. 14, 2017, now U.S. Pat. No. 10,492,038, and entitled "METHOD AND APPARATUS TO MANAGE MESSAGING PROVIDING DIFFERENT OPTIONS OF COMMUNICATION DEPENDING ON ONE IDENTIFIER AND NOT REQUIRING TO DISCLOSE CONTACT INFORMATION," which is hereby incorporated herein by reference, which application is a continuation of U.S. patent application Ser. No. 15/469,440, filed Mar. 24, 2017, now U.S. Pat. No. 10,142,810, and entitled "A NETWORD-BASED PORTAL TO MANAGE COMMUNICATION,", which is hereby incorporated herein by reference, which application is a continuation of U.S. patent application Ser. No. 14/922,344, filed Oct. 26, 2015, now U.S. Pat. No. 9,736,664, and entitled "SYSTEMS AND PROCESSES TO MANAGE MULTIPLE MODES OF COMMUNICATION," which is hereby incorporated herein by reference, which application is a continuation of U.S. patent application Ser. No. 14/272,632, filed May 8, 2014, now U.S. Pat. No. 9,204,268, and entitled "SYSTEMS AND PROCESSES TO MANAGE MULTIPLE MODES OF COMMUNICATION," which is hereby incorporated herein by reference, which application is a continuation of U.S. patent application Ser. No. 12/798,995, filed Apr. 14, 2010, now U.S. Pat. No. 8,744,407, and entitled "SYSTEMS AND PROCESSES TO MANAGE MULTIPLE MODES OF COMMUNICATION," which is hereby incorporated herein by reference, which application is a continuation of U.S. patent application Ser. No. 11/452,115, filed Jun. 12, 2006, now U.S. Pat. No. 7,729,688, and entitled "SYSTEMS AND PROCESSES TO MANAGE MULTIPLE MODES OF COMMUNICATION", which is hereby incorporated herein by reference, which application is a continuation-in-part application of U.S. patent application Ser. No. 11/006,343, filed Dec. 7, 2004, now U.S. Pat. No. 7,116,976, and entitled "ADAPTABLE COMMUNICATION TECHNIQUES FOR ELECTRONIC DEVICES," which is hereby incorporated herein by reference, which claims priority to U.S. Provisional Patent Application No. 60/527,565, filed Dec. 8, 2003, entitled "ADAPTABLE COMMUNICATION TECHNIQUES FOR ELECTRONIC DEVICES," and which is hereby incorporated herein by reference.

This application, by way of U.S. patent application Ser. No. 11/452,115, also claims priority to U.S. Provisional Patent Application No. 60/689,686, filed Jun. 10, 2005, entitled "SYSTEMS AND PROCESSES TO MANAGE MULTIPLE MODES OF COMMUNICATION," and which is hereby incorporated herein by reference.

BACKGROUND OF THE INVENTION

For many years, other than mails from post offices, we typically only received information from afar through telephones. However, in the past few years, ways that others can send us information have increased significantly. Just to list a few different modes of communication, we can be reached from standard desk phones, fax, cell phones, electronic mails, and instant messages. In addition, we can have more than one phone number and multiple electronic mail addresses. There are people we like to communicate with, and there are those we prefer to avoid. Managing information from all such different modes can be quite time consuming.

It should be apparent from the foregoing that there is still a need to help manage the numerous modes of communication.

SUMMARY OF THE INVENTION

Different embodiments of a computer-implemented system and method to manage the communication of a user are disclosed. A person tries to electronically convey a message to the user. In one embodiment, the status of the user is identified; the identity of the person is identified; the urgency of the message is identified; the access priority of the person is determined based on the person's identity; and a process is set to manage the message using one or more rules, and in view of the status of the user, the access priority of the person and the urgency of the message.

Based on different embodiments, the status of the user depends on the current activity or location of the user, or the current time. The status of the user can also be defined by the user. Similarly, the access priority of the person can be defined by the user, or is set depending on the user's reaction towards a prior message from the person. Also, the urgency of the message is set by the person.

The process can depend on the mode of communication of the message. For example, the mode of communication can include a mobile phone, an office phone, a home phone, a mobile SMS, a pager from a mobile phone or PDA, a home/office SMS, mobile online chat, home online chat, a voice mail with/without instant notification, an office fax, a home fax, a mobile email, and an email.

In one embodiment, the user receives the message through a handheld device, such as a cellular phone. In another embodiment, the message is electronically conveyed based on Internet protocol through a website.

In one embodiment, though the process allows the user to receive the message, the person is not aware of the contact information of the user. For example, the person is not aware of the phone number of the cellular phone that the user used to talk to the person. This prevents the person from directly accessing the user without going through an intermediate control, such as a website. Similarly, the user does not have to be aware of the contact information of the person.

In another embodiment, the defined access priority of the person is stored at a website, allowing the website to access such information without asking for the user's permission. In one embodiment, the defined access priority is stored in a private database under the user's control.

In one embodiment, text messages could be received in an audio manner, and audio messages could be sent as text messages.

In one embodiment, messages can be received via a headset.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 1 shows a number of intelligent communication modes according to one embodiment of the invention.

FIG. 2 shows a number of contact classes according to one embodiment of the invention.

FIG. 3 shows a number of urgency classes according to one embodiment of the invention.

FIG. 4 shows a number of statuses of a user according to one embodiment of the invention.

FIG. 5 shows one embodiment of an example of an Access Priority Database according to one embodiment of the invention.

Figure 6:
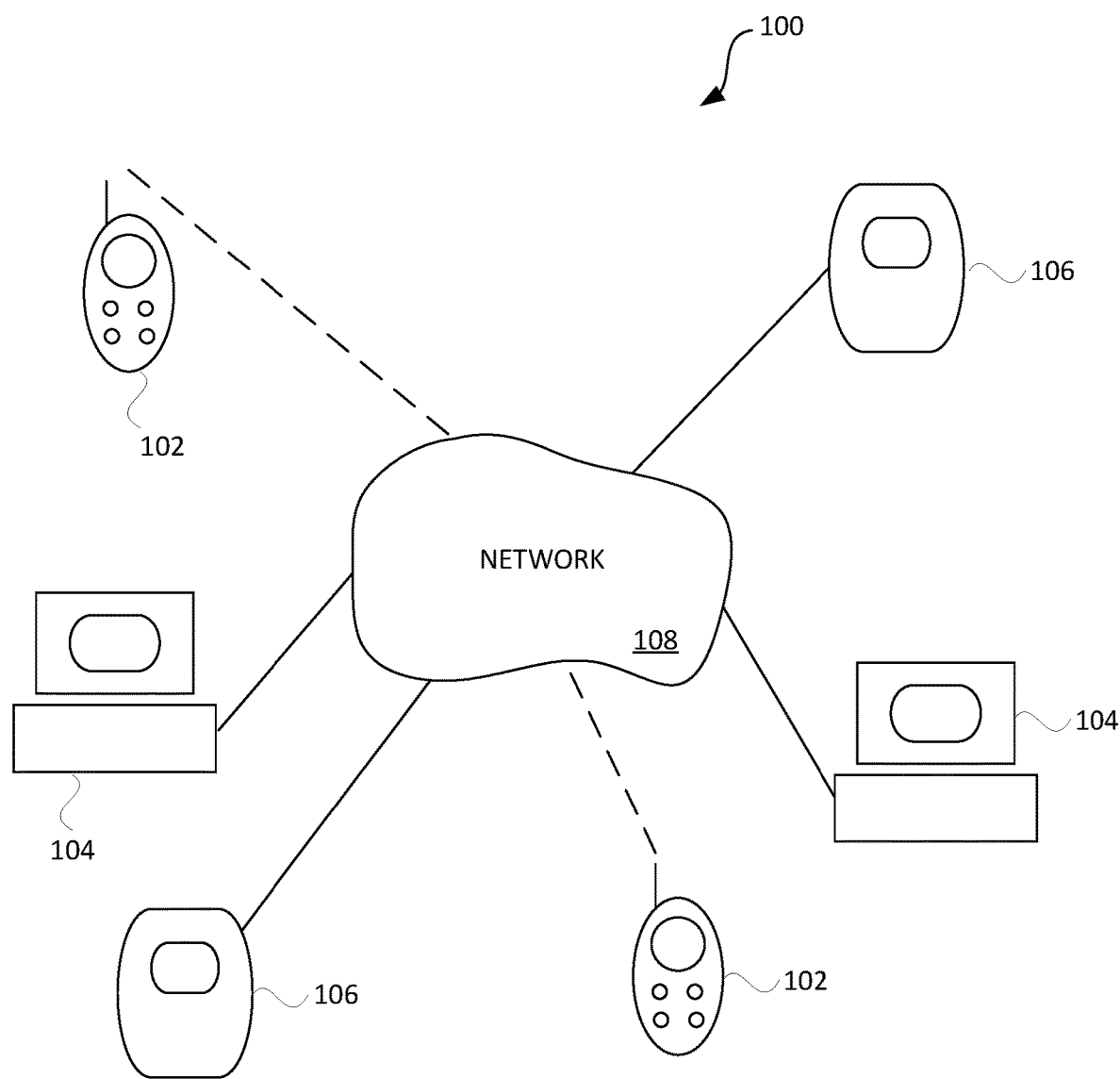
FIG. 6 is a communication system according to one embodiment of the invention.

Same numerals in FIGS. 1-12 are assigned to similar elements in all the figures. Embodiments of the invention are discussed below with reference to FIGS. 1-12. However, those skilled in the art will readily appreciate that the detailed description given herein with respect to these figures is for explanatory purposes as the invention extends beyond these limited embodiments.

DETAILED DESCRIPTION OF THE INVENTION

One embodiment of the invention can automatically remove unwanted communications. Certain communications are relatively easy to determine to be unwanted, such as marketing cold calls and wrong number calls. Other communications may be more difficult. They can depend not just on the sources of the communication, but also the conditions or status of the receiver (a user) of the communication. The status can be related to the user's current activity and/or location. For example, when the user is on a train going to work, the user probably does not mind chatting with his grandchild. However, if the user is having his yearly review meeting with his boss, the user probably would prefer to avoid the call from his grandchild, unless it is an emergency. Based on the embodiment, communications from sources the user wants to postpone receiving can be automatically diverted.

In one embodiment, the user can get appropriate notification on the source of the incoming communication request. The attributes of the notification can depend on the urgency of the communication and/or the status of the user.

The user may receive information from different modes of communication. For example, the user can have mobile phones, fixed lines at home or office, emails, SMS, and faxes, with their different numbers and/or addresses. One embodiment can help the user efficiently manage information from the different modes. The user only has to remember one specific address from one mode of communication. Through that address, the user can receive communications from all modes of communication, independent of where the user is, or the type of hardware the user has. This allows the user to efficiently maintain his communication from the numerous modes even when he is traveling. For example, the user does not have to change phones (and the phone numbers) when he moves from areas covering 3G to areas that do not.

A number of embodiments depend on the different modes of communication converging onto the internet protocol platform. A communication gateway or a portal is formed allowing the user to receive communications from numerous sources through different modes. This, in turn, could reduce the numerous addresses the user has to remember, to one address. For example, an e-mail address for the user can serve as an access identifier for the different communication addresses from different communication modes. The access identifier can become the user's digital identity. In one embodiment, the user's other types of identification, such as the user's driver licenser number, can be the user's access identifier.

One embodiment of the invention uses an open portal based on the web. Based on the portal, the user can securely determine who can reach him at what conditions. This can be done based on a status indicator. As an example, this indicator is determined according to the status of the user, the access priorities of the person trying to reach the user (or the relationship or the lack of relationship between the user and the person), and/or the urgency of the message from the person. The status of the user can be dynamically determined, based on the current condition(s) of the user. The portal can allow the user and the person to select different options, which can be modified as desired. For example, the relationship can be preset by the user and stored in a database, while the urgency of the message can be set by the person.

Thus, in one embodiment, the portal can be used to control the selection and setting of different intelligent communication modes for the user. These intelligent communication modes allow priorities of various kinds of communication options to be set by the user. The portal allows worldwide access to the user, and can dynamically determine, for example, whether a call initiated at different time by different callers should be accepted by the user in real-time or handled by other mechanisms. From this information, communication requests can be classified, for example, into different degrees of undesirability. Some requests can be automatically blocked from the user. Others can be diverted and handled by other mechanism, such as diverting a phone call to an email or voice mail.

In one embodiment, the portal or gateway also includes a database to keep track of the user's different contacts or acquaintances, and the access priorities of each contact. The user can modify information in the database, such as assigning and/or changing the priorities of the contacts. Based on the information (or lack of information) in the database of the contact trying to access the user, and based on the status of the user, the gateway can automatically select an intelligent mode of communication for the user. This selection can be done dynamically.

In one embodiment, the portal can dynamically change the access priorities of a caller trying to reach the user. For example, previously the caller is of high priority to the user, and the user has set her access priorities accordingly. Lately, every time the caller trying to reach the user, the request was denied. After a preset number of rejections, the portal can automatically send a message to the user, asking the user if the user would like to lower the access priority of the caller. If the response is affirmative, the caller's priority is automatically reduced.

In another embodiment, the user does not have to set priorities of each contact. The system monitors every call, and provides the contact's identity to the user. Based on the user's reaction to the call (e.g. accepting or rejecting it), the system automatically sets the contact's priorities. In one embodiment, the system can then query the user for approval on the setting, and allow the user to adjust it as necessary. In another embodiment, the system can continue to modify the caller's priorities based on the user's reaction to the caller's subsequent calls.

In one embodiment, the user could keep information he believes to be sensitive local in a different database. Such information can be stored securely under the user's direct control. The portal can retrieve information from the different database when required. In another embodiment, the user can restrict or limit such retrieval process.

Additional confidentiality can be provided. In one embodiment, using phone calls as an example, the user can be aware of the identity of the caller even without being informed of the number of the caller. Similarly, the caller can reach the user without being aware of the number of the phone the user is using to receive the call. The user can keep his location and/or status confidential but still can receive the communication. This can be useful because there are situations, for example, when the user does not want to disclose his contact information but the user needs to receive services provided by the caller.

One approach to maintain such confidentiality while maintaining real-time communication is based on a system that digitally identifies the identities of the caller and the receiver. Note that the term caller is used in general. It is not just limited to phone calls, but they can be any person or entity requesting to communicate with the user, such as trying to send a message to the user. As a separate note, the caller can also be a user of different embodiments of the invention.

After determining the identities, the system can establish connections between the caller and the user in real time. Though contacts are established, the system only needs to ensure the identities of the caller and the user to each other. However, the system does not have to disclose the phone numbers, electronic addresses, physical locations and/or other attributes of the caller and the user to each other. In one embodiment, real time implies that the time required for the identification is similar to the typical time required to set up, for example, a telephone call. The system can be a portal based on the web.

In one embodiment, a portal also holds the user's electronic calendar. The calendar can be programmable, with entries set by the user. The portal can automatically and securely set appointments for the user since the portal knows the identity of the caller, and the status and schedule of the user. For example, the appointment can be for a conference call.

To illustrate, in one embodiment, a portal provides a number of intelligent communication modes (ICM) for the user to select as shown in FIG. 1. There are three columns in the table. If the communication mode selected in the second column does not work, the portal automatically defaults to the corresponding approach in the third column. For example, under ICM 1, if the mobile phone is busy, default to voice mail. Some of the selections do not have any default because it may not be necessary to default. For example, under ICM 8, the incoming message goes directly to voice mail with instant notification to mobile devices of the user. The incoming message can usually go to voice mail. There is no need to default.

As a receiver of communication, the user can define a number of contact classes, as shown in FIG. 2. The user can set up a number of urgency classes, as shown in FIG. 3. The user can define a number of status, as shown in FIG. 4. Then, based on tables in FIGS. 1-4, the user can set up an Access Priority Database for different ContactClasses, as shown in FIG. 5.

As another example, the user can categorize the following contacts into the corresponding ContactClasses:

| | |
|---|---|
| Alice (Wife) | ContactClass1 |
| Peter (Close Friend) | ContactClass2 |
| Colina (Close Friend's wife) | ContactClass2 |

Peter wants to make a mobile phone call to the user. In one embodiment, Peter calls a portal. As an example, the portal can be the user's ISP. The portal first verifies the caller's identity to be Peter. This can be done, for example, by a public key challenge based on Peter having a public key digital certificate. In another example, Peter is also a registered user of the portal. Then, Peter's identity can be more readily identified or verified.

In one embodiment, after verification, a virtual address/number for the communication session is created allowing Peter to reach the user, which can be by phone. The user's phone number does not have to be disclosed to Peter. Similarly, Peter's mobile phone number does not have to be disclosed to the user. The portal can assure the user that the person calling is Peter based on an identification verification process, such as ones described above.

In establishing contact, the portal can access the user's database and determine that Peter belongs to ContactClass2. The database can, for example, be in the portal.

In another embodiment, the database is in a personal communication device of the user. The portal accesses the personal communication device to determine Peter's ContactClass.

Based on the ContactClass information, the status of the user and Peter's urgency setting, the user may receive Peter's call directly. As another example, Peter may be asked to leave a voice mail to the user, while the user is notified by a mobile short message regarding an incoming call from Peter.

As additional examples, in one embodiment, location information of the user could be determined based on GPS information from, for example, the user's cell phone.

In one embodiment, the user receives messages through a handheld device, such as a phone, and the phone has a switch. The switch can be a physical button or a software setting, such as a pull-down menu. The user could set his status dynamically by changing the physical or logical position of the switch. For example, one position can indicate that the user is very busy, and should only be interrupted by an urgent message from the user's closest contacts, such as his wife or parents. Another position can indicate that the user's status allows the user to receive any messages from anyone.

As explained above, based on an embodiment, a message is electronically conveyed by a central network server, such as a web server based on Internet protocol. A portal or gateway approach could provide general Internet access to one or more embodiments of the communication management systems so that users can configure the system behavior they desire. The portal or gateway can then facilitate download of a database or update thereto to a communication device, such as a phone.

Also, as explained above, based on an embodiment, a user could efficiently maintain his communication, and does not even have to change phones when he moves from areas covering 3G to areas that do not. These phones could be based on different communication mechanisms, such as GSM, CDMA, 3G and 4G systems. Also as explained above, the user could keep information in local databases, such as in such a phone. For example, the intelligent communication modes shown in FIG. 1 for the user to select are in the phone. The user could define the contact classes, such as the ones shown in FIG. 2; set up the urgency classes, such as the ones shown in FIG. 3; define the statuses, such as the ones shown in FIG. 4; set up the Access Priority Database, such as the one shown in FIG. 5; and categorize a number of the user's contacts into the corresponding ContactClasses, all in the phone. When a caller places a call to the phone, based on information previously set in the phone and based on the urgency class selected by the caller, the phone could automatically manage the communication. Note that the phone does not have to be a cellular phone. In one embodiment, the phone is a desk top phone.

Again as explained above, the person or the caller trying to contact the user could select different options. For example, the urgency of the message can be set by the caller. This selection is typically in the call setup phase. In one embodiment, the caller has pre-selected the urgency class before making the call. In another embodiment, if the caller has not selected the urgency class, the system could prompt the caller to input an urgency class or status before the call or message is routed to the user. In yet another embodiment, different urgency classes could be defined by the caller.

Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Further, the computer-implemented methods and systems discussed above can be used in conjunction with one or more of the various approaches discussed in U.S. patent application Ser. No. 11/006,343. For example, the automated actions or decisions (e.g., intelligent secretary, decision 204 in FIG. 2, etc.) of U.S. patent application Ser. No. 11/006,343 can be automatically made by the systems/methods described above. Still further, the various approaches discussed in U.S. patent application Ser. No. 11/006,343 can be used in conjunction with one or more the various methods/systems discussed above. For example, the systems/methods described above can use the messaging approaches (e.g., audio or textual messages) described in U.S. patent application Ser. No. 11/006,343.

Different embodiments of the invention pertain to improved approaches for users of electronic devices to communicate with one another. The electronic devices have audio and/or textual output capabilities. The improved approaches can enable users to communicate in different ways depending on device configuration, user preferences, prior history, time or other criteria. In one embodiment, the communication between users is achieved by short audio or textual messages.

The electronic device can be any computing device having communication capabilities. Such computing devices can be referred to as communication devices. Examples of electronic devices include personal computers, personal digital assistants, pagers or mobile telephones.

Embodiments of the invention are discussed below with reference to FIGS. 6-12. However, those skilled in the art will readily appreciate that the detailed description given herein with respect to these figures is for explanatory purposes as the invention extends beyond these limited embodiments.

FIG. 6 is a communication system 100 according to one embodiment of the invention. The communication system 100 can support different communication devices, including mobile telephones 102, computers 104 (e.g., personal computers) and/or wireless personal digital assistants (PDAs) 106. Users of the communication devices 102-106 can communicate with like or different communication devices. Each communication device 102-106 offers one or both of audio or textual communication capabilities. These communication devices 102-106 can inter-communicate with one another through a network 108. The network 108 can include one or more of voice networks and data networks. For example, one network is a data network providing a slow speed data channel for transmission of Short Message Service (SMS) messages (which are typically limited to 160text characters) to a Short Message Service Center (SMSC) and then forwarded on to the destination. Besides short messages (e.g., SMS messages), the network 108 can also support other messaging protocols for sending and receiving enhanced messages (EMS), multimedia messages (MMS), email and fax messages. Other networks support faster data channels and voice channels, such as GPRS, UMTS, G4, GSM, CDMA and various protocols, such as UDP, TCP, WAP, PDP other protocols.

According to one embodiment of the invention, one of the communication devices 102-106 can send a short message to another of the communication devices 102-106. The short message can be text-based or audio based. The sending communication device allows its user to create the short message as the user desires and/or as the device permits. For example, the user might interact with a keypad or keyboard to enter the short message, or the user might record audio inputs (e.g., speech) for the short message. The short message can then be sent to the receiving communication device. The sending of the short message may involve converting the short message from an audio message to a text message, or vice versa. Also, the receiving communication device can further convert the short message from audio-to-text or from text-to-audio. In any case, the short message is presented (e.g., displayed or played) to the user of the receiving communication device. The presentation can vary as the user desires or as the device permits.

One aspect of the invention pertains to improved approaches to respond to incoming voice calls. The improved approaches enable a called party (i.e., a party being called) to provide some information to a calling party without directly engaging in a voice call with the calling party. The called party can choose not to take the voice call from the calling party. Instead, the called party can provide the calling party with some limited information. The limited information can be provided in an audio or textual format. In one embodiment, the limited information provides the calling party with feedback as to why the voice call was not taken.

Figure 7:
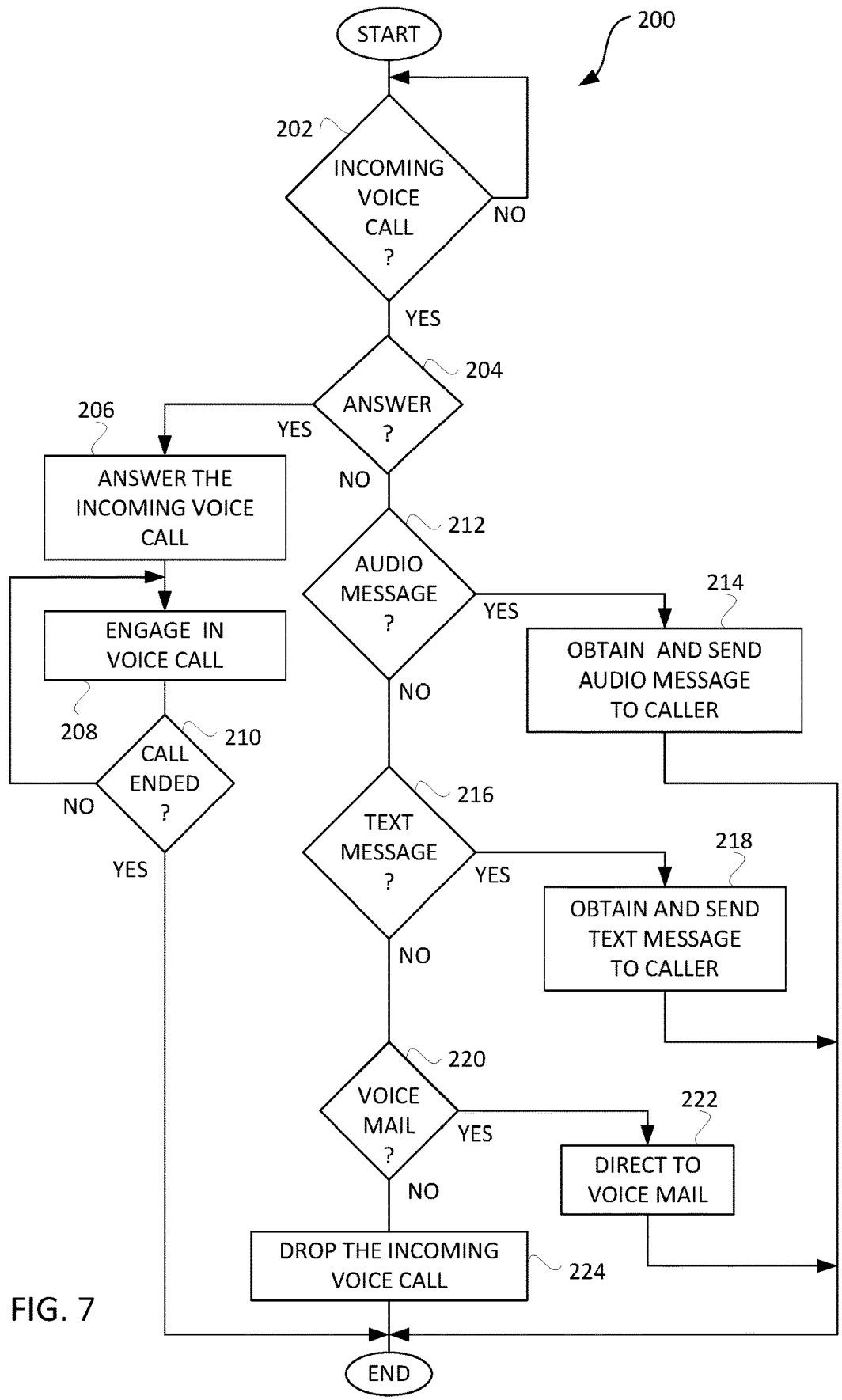
FIG. 7 is a flow diagram of a personal call response process according to one embodiment of the invention.

FIG. 7 is a flow diagram of a personal call response process 200 according to one embodiment of the invention. The personal call response process 200 is performed by an electronic device, such as a mobile communication device (e.g., mobile telephone). The personal call response process 200 begins with a decision 202 that determines whether there is an incoming voice call. When the decision 202 determines that there is no incoming voice call, then the personal call response process 200 awaits such a call. Once the decision 202 determines that there is an incoming voice call, a decision 204 determines whether the incoming voice call is to be answered. Typically, the user of the electronic device would signal the electronic device as to whether or not to answer the incoming voice call. Alternatively, the electronic device could automatically decide whether to answer the call.

When the decision 204 determines that the user desires the incoming voice call to be answered, the incoming voice call is answered 206 and the user engages 208 in a voice call with the calling party. A decision 210 then determines whether the call has ended. When the decision 210 determines that the call has not yet ended, then the personal call response process 200 can return to repeat the block 208 while the voice call continues. Once the decision 210 determines that the voice call has ended, then the personal call response process 200 ends.

When the decision 204 determines that the user does not desire to answer the incoming voice call, a decision 212 determines whether the user desires to provide an audio message to the calling party. When the decision 212 determines that the user does desire to provide an audio message to the calling party, an audio message is obtained and sent 214 to the calling party (caller).

Alternatively, when the decision 212 determines that the user does not desire to provide an audio message, a decision 216 determines whether the user desires to provide a text message to the calling party. When the decision 216 determines that the user desires to provide a text message to the calling party, a text message is obtained and sent 218 to the calling party.

Still further, when the decision 216 determines that the user does not desire to provide a text message to the calling party, a decision 220 determines whether the incoming voice call is to be directed to voice mail. When the decision 220 determines that the incoming voice call should be directed to voice mail, then the incoming voice call is directed 222 to voice mail. On the other hand, when the decision 220 determines that the incoming voice call is not to be directed to voice mail, the incoming voice call is dropped 224. Following the blocks 214, 218, 222 and 224, the personal call response process 200 is complete and ends.

In another embodiment, a personal call response process could announce the calling party to the called party (user). In announcing the calling party, the personal call response process would present the called party with information pertaining to the calling party (e.g., display or audio sound). Such information could, for example, help the called party to decide whether to answer the incoming voice call. The information can, for example, include one or more of name (individual or business), telephone number, or other caller identification. The information could also include status information of the calling party, such as position, health, mood, etc. As an example, the information could be presented to the user prior to the decision 204 of the personal call response process 200 shown in FIG. 7.

In still another embodiment, an automated decision process to decide whether to answer a call can be based on time (e.g., decision 204). For example, the called party can previously set a rule, such as that from midnight to 6 am, the party does not want to answer voice calls. Then, during this time period, the electronic device can automatically decide not to answer incoming calls. In one implementation, when the electronic device decides not to answer incoming calls, no indication of incoming calls will be provided to the called party. For example, from midnight to 6 am, the device would not produce any ring tone. Additionally, if desired, the called party can also configure the electronic device to automatically provide an audio message or a text message to the calling party (e.g., I'm asleep call me tomorrow").

Figure 8:
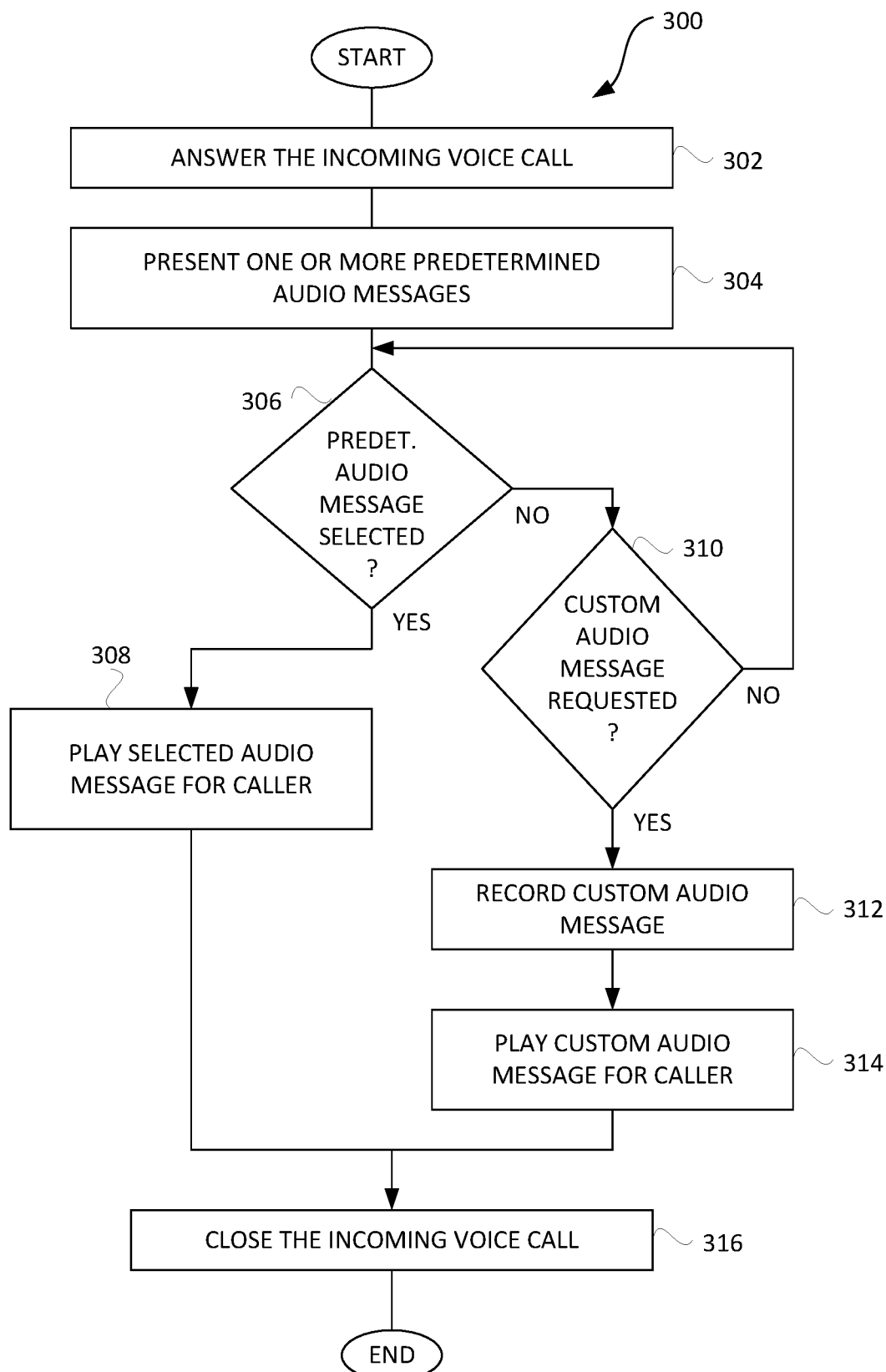
FIG. 8 is a flow diagram of an audio message response process according to one embodiment of the invention.

FIG. 8 is a flow diagram of an audio message response process 300 according to one embodiment of the invention. The audio message response process 300 is, for example, suitable for use as the processing carried out by block 214 illustrated in FIG. 7.

The audio message response process 300 initially answers 302 the incoming voice call. In this operation, the incoming voice call is answered 302 but not in a traditional way. Instead, the electronic circuitry associated with a mobile communication device (e.g., mobile telephone) that receives the incoming voice call operates to answer the incoming voice call for purposes of an audio message response. For example, a voice channel is established between the calling party and the mobile communication device, but the speaker and microphone of the mobile communication device are disabled. In effect, in such an embodiment, neither the called party nor the calling party perceives that the voice calling has been answered.

Next, one or more predetermined audio messages can be presented 304 by the mobile communication device. The presentation 304 of the one or more predetermined audio messages can, for example, be achieved by audio or visual means. For example, the predetermined audio messages can be audio output to a speaker associated with the mobile communication device for the called party or can be visual output (e.g., text) to a display of the mobile communication device for the called party (e.g., user of the mobile communication device).

A decision 306 then determines whether a predetermined audio message has been selected. Here, the decision 306 determines whether the user (i.e., called party) of the mobile communication device has selected one or more of the predetermined audio messages. When the decision 306 determines that a predetermined audio message has been selected, then the selected audio message is played 308 for the calling party. Here, the mobile communication device can output the selected audio message to the calling party over the voice channel. Typically, the mobile communication device of the called party would not produce an audible output at the mobile communication device, so that the called party would not be disturbed by the sending of the audio response. The predetermined audio messages are normally short messages (e.g., not more than 160 characters)

so that the duration of time the voice channel is needed and/or the amount of network bandwidth consumed is minimal.

On the other hand, when the decision 306 determines that none of the predetermined audio messages have been selected, then a decision 310 determines whether a custom audio message is requested. A custom audio message is an audio message that is specifically provided for the calling party. When the decision 310 determines that a custom audio message is not being requested, then the audio message response process 300 returns to repeat the decision 306 and subsequent operations. Alternatively, when the decision 310 determines that a custom audio message is requested, then a custom audio message is recorded 312. Thereafter, the custom audio message that has been recorded can be played 314 for the calling party (caller). Here, typically, the custom audio message would be output by the mobile communication device of the called party over the voice channel to the calling party. Typically, the mobile communication device of the called party would not produce an audible output at the mobile communication device, so that the called party would not be disturbed by the sending of the audio response. The custom audio messages are also normally short messages (e.g., not more than 160 characters) so that the duration of time the voice channel is needed and/or the amount of network bandwidth consumed is minimal.

Following the operations 308 and 314, the incoming voice call is closed 316. In other words, after the selected audio message or the custom audio message is played 308, 314, the incoming voice call can be closed 316. Following the block 316, the audio message response process 300 is complete and ends.

The predetermined audio messages that are presented 304 to a called party can be determined in a static or dynamic manner. A static determination would, for example, be when the called party has previously set or recorded an audio message to be utilized. Typically, with static determination, the list of audio messages remains the same (i.e., static) until changed (e.g., by the called party). A dynamic determination would allow the audio messages in the list (or the ordering of the audio messages in the list) to change without specific action by the user or the called party. For example, the list or ordering of the audio messages can depend on preference settings, configuration information, or prior usage. Prior usage can include biasing the list of audio messages such that those messages being most often selected appear higher in the list. The list or ordering of the audio messages can also depend on the calling party, type of calling party, location of calling party or called party, and the like. The list of audio messages can be represented by text and/or graphics (e.g., icons).

The audio message response process 300 flexibly enables a user to either select one or more predetermined audio messages or provide a custom audio message to be used as an audio message response to a calling party. However, it should be recognized that, in other embodiments, an audio message response process can alternatively simply pertain to only providing a custom audio message, or only permitting selection of a predetermined audio message. Further, in still other embodiments, an audio message response process can first determine whether a custom audio message is to be provided before presenting predetermined audio message. In yet other embodiments, an audio message response process can answer the incoming voice call later in the processing than operation 302 as shown in FIG. 8 (e.g., before operations 308 and 314).

Figure 9:
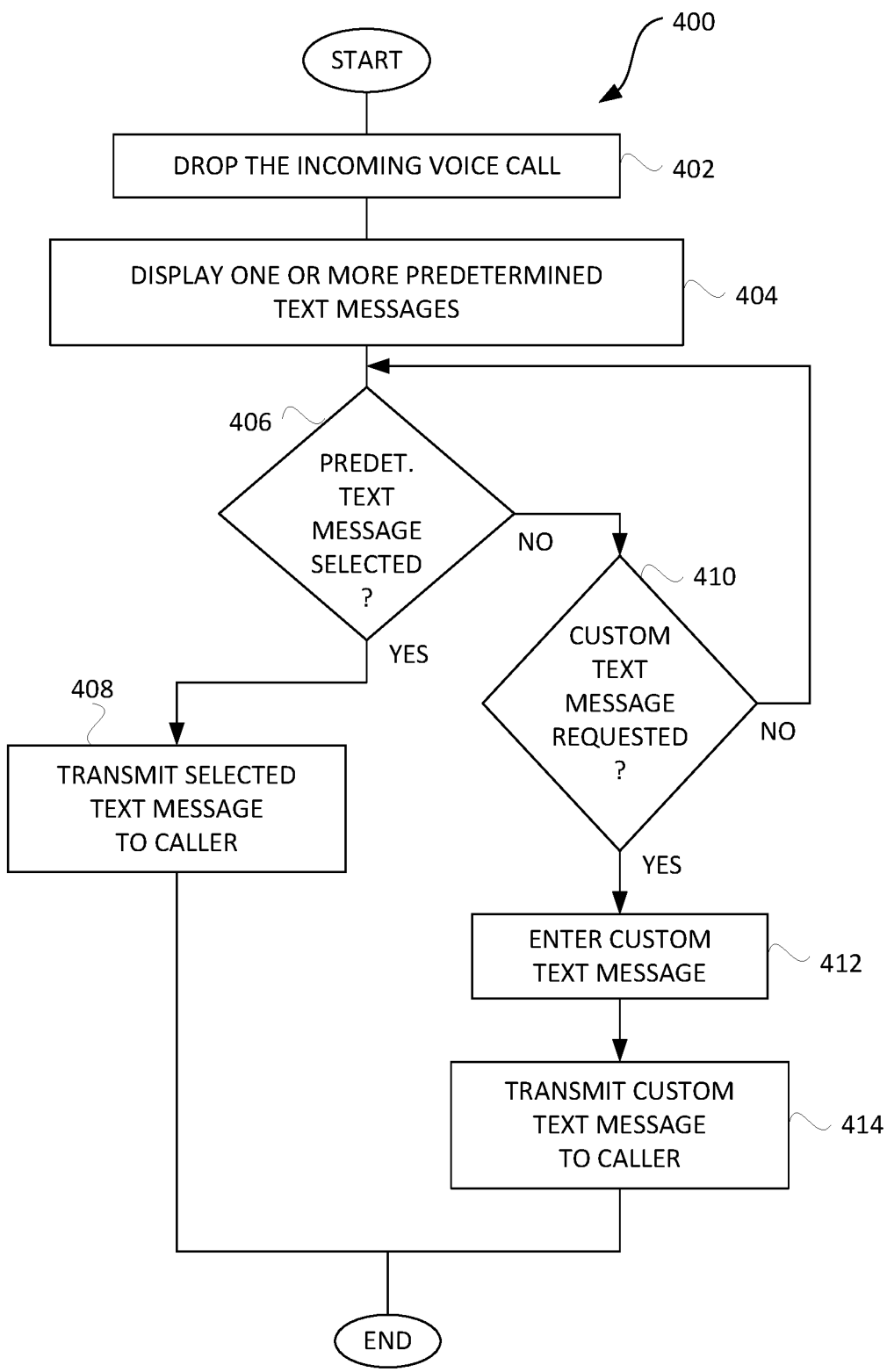
FIG. 9 is a flow diagram of a text message response process according to one embodiment of the invention.

FIG. 9 is a flow diagram of a text message response process 400 according to one embodiment of the invention. The text message response process 400 is, for example, processing performed by the block 218 illustrated in FIG. 7.

The text message response process 400 initially drops 402 the incoming voice call. Here, the information to be supplied to the calling party is a short text message; therefore, there is no need for a voice channel.

Next, one or more predetermined text messages are displayed 404. Here, the one or more predetermined text messages would normally be displayed on a display screen associated with the mobile communication device being utilized by the called party. A decision 406 then determines whether one (or more) of the predetermined text messages has been selected. When the decision 406 determines that a predetermined text message has been selected, then the selected text message is transmitted 408 to the caller (i.e., the calling party).

On the other hand, when the decision 406 determines that a predetermined text message has not been selected, then a decision 410 determines whether a custom text message is requested. When the decision 410 determines that a custom text message is not requested, then the text message response process 400 returns to repeat the decision 406 and subsequent operations. Alternatively, when the decision 410 determines that a custom text message is requested, then the custom text message is entered 412. Here, the called party interacts with the mobile communication device to enter the custom text message. Then, the custom text message is transmitted 414 to the caller. In one embodiment, the transmission 408, 414 of the text message can be performed over a communication network, such as a network having a Short Message Service Center (SMSC) supporting Short Message Service (SMS) messages. Following the transmission 408 of the selected text message or the transmission 414 of the custom text message, the text message response process 400 is complete and ends.

An alternative embodiment of a text message response process could operate to answer the incoming voice call and announce to the caller that a text sage will be forthcoming. Then, the incoming voice call could be promptly dropped. This additional operation could, for example, be used with the text message response process 400 by providing an additional operation prior to the block 402 illustrated in FIG. 9.

The predetermined text messages being displayed 404 to a called party can be determined in a static or dynamic manner. A static determination would, for example, be a text message the called party has previously set or entered. Typically, with static determination, the list of text messages remains the same (i.e., static) until changed (e.g., by the called party). A dynamic determination would allow the text messages in the list (or the ordering of the text messages in the list) to change automatically, and not by the user. For example, the list or ordering of the text messages can depend on preference settings, configuration information, or prior usage. To illustrate, prior usage can include biasing the list of text messages such that those messages being most often selected appear higher in the list. The list or ordering of the text messages can also depend on the calling party, type of calling party, location of calling party or called party, and the like. The list of text messages can identify each text message with text (e.g., at least a portion of the corresponding text message, or an abbreviation) and/or graphics (e.g., icons).

The text message response process 400 flexibly enables a user to either select one or more predetermined text messages or provide a custom text message to be used as a text message response to a calling party. However, it should be recognized that, in other embodiments, a text message response process can alternatively simply pertain to only providing a custom text message, or only permitting selection of a predetermined text message. Further, in still other embodiments, a text message response process can first determine whether a custom text message is to be provided before presenting predetermined text messages.

Figure 10:
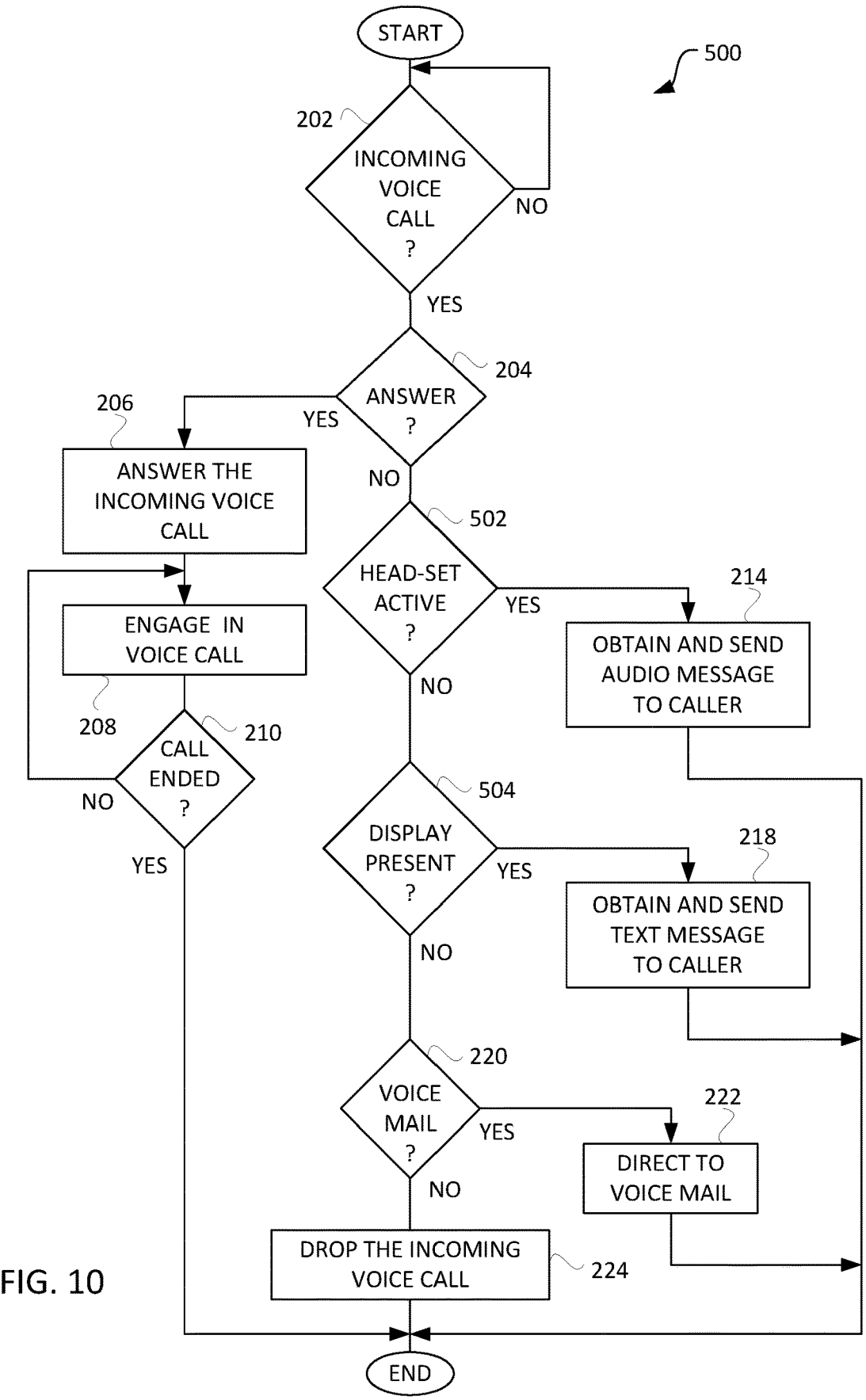
FIG. 10 is a flow diagram of an automated call response process according to one embodiment of the invention.

FIG. 10 is a flow diagram of an automated call response process 500 according to one embodiment of the invention. The automatic call response process 500 is substantially similar in many ways to the personal call response process 200 illustrated in FIG. 7. However, the automated call response process 500 operates to reduce user input at the mobile communication device by making use of stored data pertaining to its hardware components, configuration or preferences. In this regard, the automatic call response process 500 includes a decision 502 that determines whether a head-set is active. When the decision 502 determines that a head-set is active, then the automatic call response process 500 can prefer, suggest or require the user to obtain and send 214 an audio message to the caller in response to an incoming voice call. Alternatively, when the decision 502 determines that a head-set is not active, then a decision 504 can determine whether a display is present. In other words, the decision 504 can determine whether the mobile communication device has a display. When the decision 504 determines that the mobile communication device does have a display, then the mobile communication device can operate to obtain and send 218 a text message to the caller. Of course, this assumes that the caller can support text messages even though they initially called with a voice call. Hence, in another embodiment, the automatic call response process can operate to query or obtain information regarding the caller's communication device capabilities.

An exemplary scenario of how the previously described automatic call response process could work according to one implementation is as follows:

1. From his mobile phone, Bill calls Tom's mobile phone.

2. Tom is alerted by his mobile phone of an incoming call. Optionally, caller information (i.e., pertaining to Bill) can be displayed or announced to Tom.

3. Tom can choose to answer the incoming call or decline to answer the call.

4. In the event that Tom declines to answer the call, Tom can have the opportunity to provide the caller with a brief audio or text message.

5. If an audio message is to be provided, then Tom can either record a personalized message or select one of a plurality of predetermined audio messages. In this case, the incoming call is answered by Tom's mobile phone and then the audio message is played for the caller, thereafter the call is dropped. The audio messages are typically brief (i.e., short), and examples of audio messages are: (i) "Will call in 10 minutes," (ii) "Cannot talk now," (iii) "I'm in a meeting," or (iv) "Please don't call anymore."

6. On the other hand, if a text message is to be provided, then Tom can either enter a personalized text message or select from a plurality of predetermined text messages. In this case, the incoming call is dropped, and the entered text message or the selected one of the predetermined text messages is sent. Examples of text messages are: (i) "Will call in 10 minutes," (ii) "Cannot talk now," (iii) "I'm in a meeting," or (iv) "Please don't call anymore." The text messages can be English (or other language) words or phrases, or can be condensed text strings (e.g., such as slang or chat language). In one embodiment, the predetermined text messages presented to Tom can be dependent on some criteria (i.e., automatically selected). Alternatively, it is possible that Tom might want to edit the predetermined text message, such can be permitted. As yet another example, the text message can embed dynamic information, such as position, e.g., "I'm in [position] now, so I'll get back to you later." The position can be determined using a GPS receiver in the mobile phone or acquired by a remote computer and provided to the mobile phone. The position may also be further processed (locally or remotely) into a more user-friendly form, such as city, school, restaurant name, or street type addresses. The position could also be used above to assist the user in deciding whether to answer the incoming call or decline to answer the call.

7. If hardware components, configuration or preferences are taken into consideration, as illustrated in FIG. 10, the above scenario can be modified. For example, if Tom is using a head-set with his mobile phone, then an audio message may be most convenient, assuming that Tom wants to provide a particular (i.e., customized) message to Bill. The head-set allows Tom to record a brief audio message. Less conveniently, the head-set can be used to present a list of predetermined audio messages and allow Tom's selection therefrom by a button or voice-command.

8. If Tom is not using a head-set, then a text message response might be more suitable. This would typically require that Tom's mobile phone have a display and a keypad. Even so, without a head-set, Tom could still record an audio message, though such would likely be less convenient.

9. Tom can also not provide an audio message or a text message and simply let the incoming call roll-over into voice mail.

The exemplary scenario can also be used in a case where the called party is using one line but the mobile device has multi-line capabilities or call waiting. In such case, the mobile phone can enable the called party to provide a brief audio or text message to the calling party as noted above. Alternatively, the mobile phone can itself automatically (i.e., without user input) respond to the calling party via an audio or text message since the mobile phone is aware that the called party is on the other line.

In this aspect of the invention, the calling party and the called party often use mobile communication devices, such as mobile phones. However, the parties can alternatively use other electronic devices, such as a PDA, a computer, etc. Further, the option to provide a text response could be prevented if the caller's device is known to not support text messages.

The advantages of the previously described embodiments are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Figure 11:
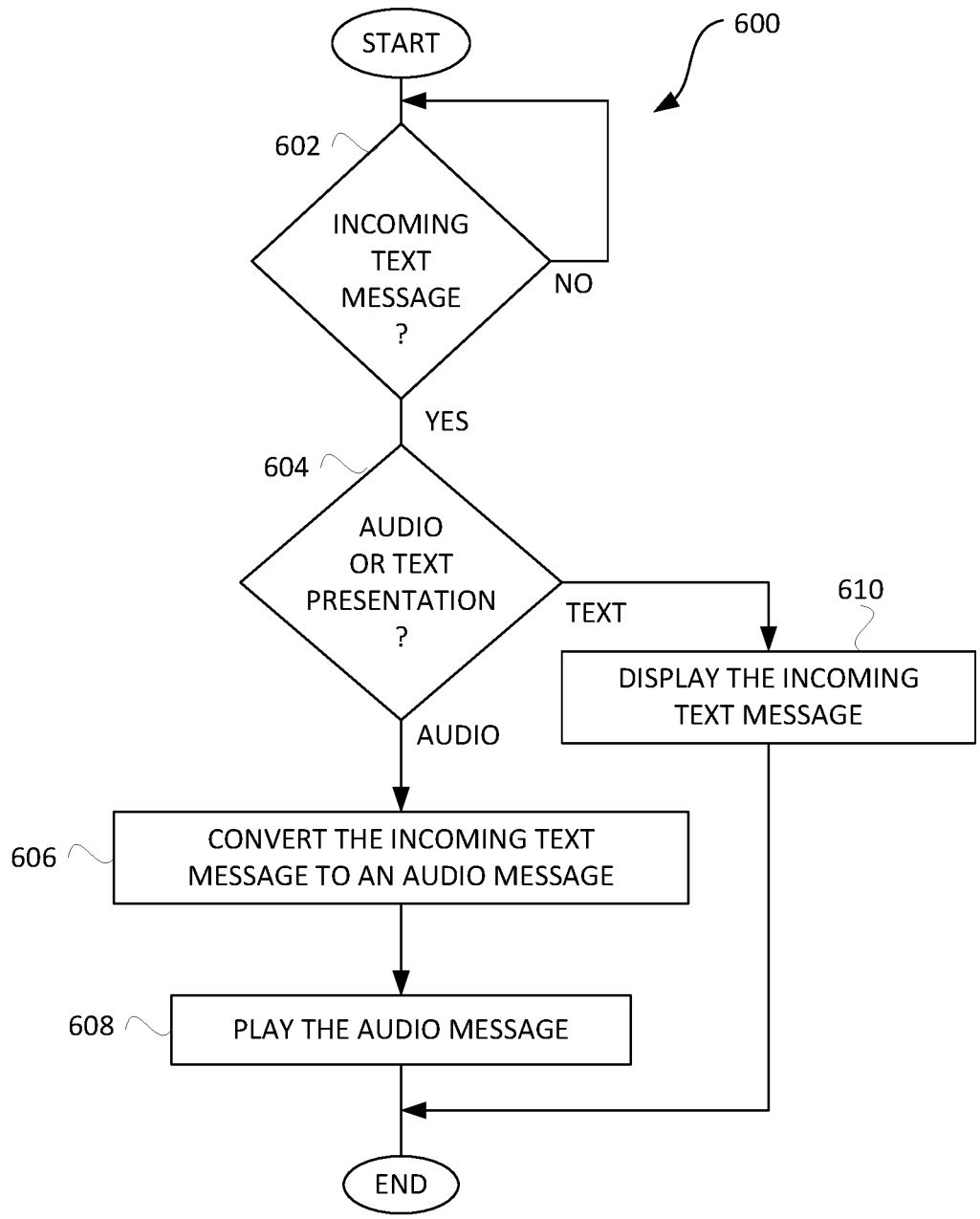
FIG. 11 is a flow diagram of a message presentation process according to one embodiment of the invention.

FIG. 11 is a flow diagram of a message presentation process 600 according to one embodiment of the invention. The message presentation process 600 is performed by an electronic device, such as a mobile communication device.

The message presentation process 600 begins with a decision 602 that determines whether an incoming text message is present. Typically, the incoming text message would be transmitted to the mobile communication device from another communication device. When the decision 602 determines that an incoming text message is not present, then the message presentation process 600 awaits such message. Once the decision 602 determines that an incoming text message has been received, a decision 604 determines whether an audio or text presentation is to be utilized. The decision 604 can be performed in a variety of different ways. For example, the determination of whether to utilize an audio or text presentation can be based on user input or can be automatically determined through a use of configuration or preference information or hardware components (e.g., display, speaker, head-set).

When the decision 604 determines that an audio presentation is to be utilized, the incoming text message is converted 606 to an audio message. For example, a text-to-speech conversion can be performed. In one embodiment, a user of the electronic device can be permitted to choose speech characteristics, such as a voice, tone, pace, accent, or mood, for the resulting speech. For example, a user could choose speech characteristics by preference settings. In another embodiment, the incoming text message can include or reference speech characteristics so that the initiator can control or influence speech characteristics. In still another embodiment, if the text to be converted contains condensed text (e.g., such as slang or chat language), the resulting speech can pertain to an uncondensed form of the text. The ability to convert from condensed text to resulting speech for uncondensed text can be facilitated by pattern matching. For example, in chat language "LOL" can be converted to an audio message for "lots of love." In one implementation, a table can store audio messages corresponding to chat terms or phrases. In another implementation, a first table would store uncompressed terms or phrases corresponding to chat terms or phrases, and a second table would store audio messages corresponding to the uncompressed terms or phrases.

After the incoming text message is converted to the audio message, the audio message is played 608. Typically, the audio message is played 608 by the mobile communication device for the user. For example, the audio message can be output to a speaker of the mobile communication device or a headset used therewith. As a result, the user of the mobile wireless communication device receives an audio message even though the incoming message was a text message.

On the other hand, when the decision 604 determines that a text presentation is to be utilized, the incoming text message is displayed 610. Here, the incoming text message would be displayed 610 on a display associated with the mobile communication device. Following the blocks 608 and 610, the message presentation process 600 ends.

As discussed above, text-to-speech conversion can be invoked and performed on an electronic device, which may be a mobile communication device. While text-to-speech conversion, particularly if high quality is desired, requires substantial processing capabilities, mobile electronic devices, such as mobile communication devices, given their small form factor and price competition, tend to have limited processing capability. Accordingly, in one embodiment, text-to-speech conversion can be off-loaded from the mobile device. For example, a remote server computer can be provided the text message and produce the resulting audio message, and then supply the audio message to the mobile device. The remote server computer can be a networked server coupled to the network 108. One example of a networked server is a gateway computer for a wireless electronic device, such as a mobile telephone.

Figure 12:
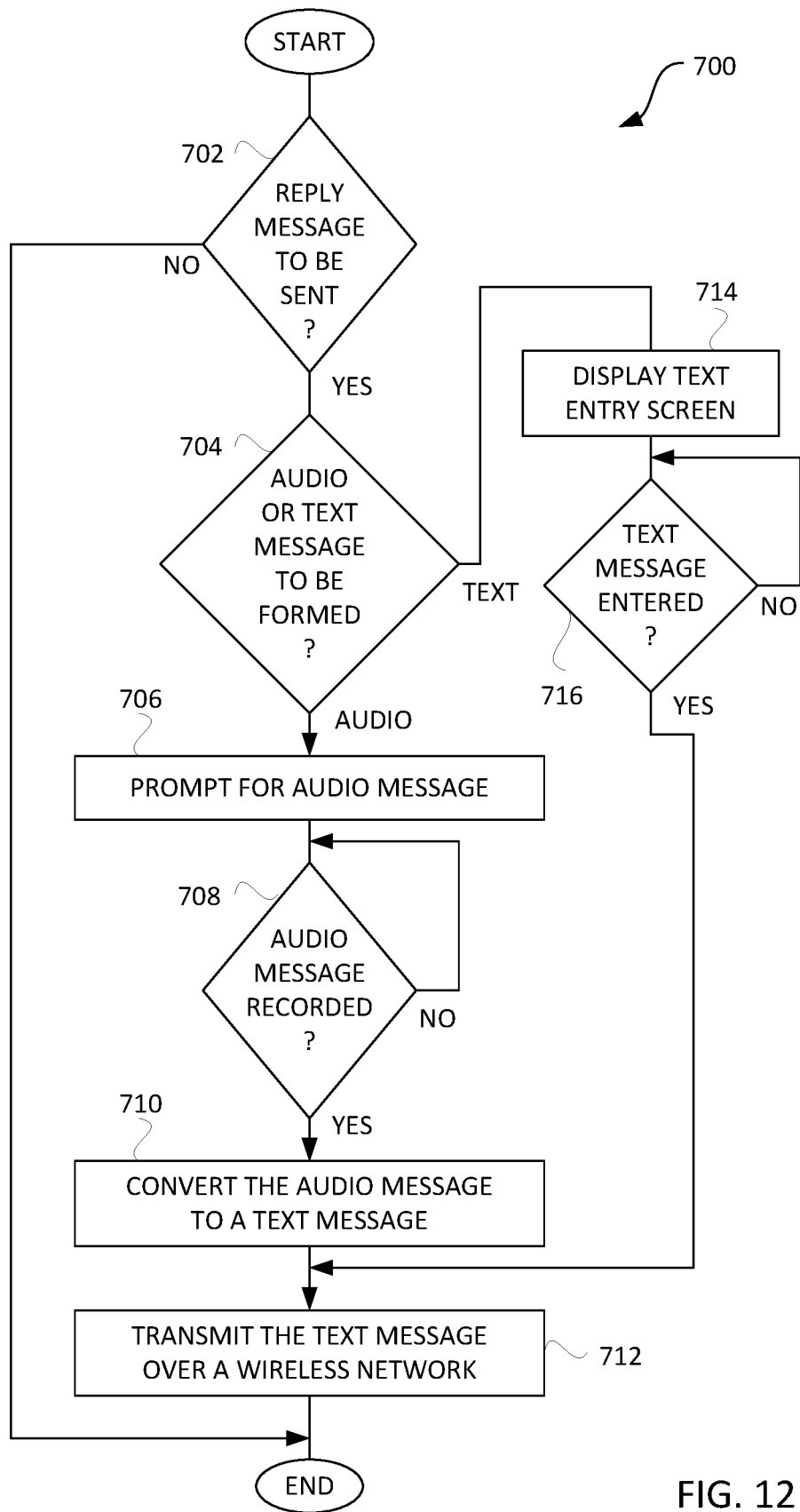
FIG. 12 is a flow diagram of a reply message process according to one embodiment of the invention.

FIG. 12 is a flow diagram of a reply message process 700 according to one embodiment of the invention. The reply message process 700 is performed by an electronic device, such as a mobile communication device.

The reply message process 700 begins with a decision 702 that determines whether a reply message is to be sent. Typically, the reply message process 700 follows the presentation of an incoming text message to a user of a mobile communication device. Hence, the reply message to be sent is a reply to the incoming text message. However, in other embodiments, the reply message to be sent can be merely an initial message as opposed to a response to an earlier message.

In any case, when the decision 702 determines that a reply message is not to be sent, then the reply message process 700 ends or simply awaits the need to send a reply message. On the other hand, when the decision 702 determines that a reply message is to be sent, then a decision 704 determines whether an audio or text message is to be formed. The decision 704 can be performed in a variety of different ways. For example, the determination of whether to send an audio or text message can be based on user input or can be automatically determined through a use of configuration or preference information or hardware components (e.g., display, speaker, head-set).

When the decision 704 determines that an audio message is to be formed, then the reply message process 700 prompts 706 for an audio message. Here, the prompt 706 can be directed to the user of the mobile communication device. The prompt can be an audio or textual indication. Next, a decision 708 determines whether an audio message has been recorded. When the decision 708 determines that the audio message has not been recorded, then the reply message process 700 awaits the audio message. Once the decision 708 determines that the audio message has been recorded, then the audio message is converted 710 to a text message. In one embodiment, if the audio message recorded is greater than a maximum text message size (e.g., 150 or 160 characters), then the audio message can be shortened so that the resulting text message does not exceed the maximum text message size. One way to shorten the text message is to use abbreviations. For example, the words "For example" can be changed to "e.g.". Such conversion can be again be performed by matching entries in tables. Another way to shorten is to remove non-essential text. Still another way to shorten is to clip off or truncate the text message at the maximum text message size. In another embodiment, the resulting text message might provide an indication that it was converted from an audio message. Following the block 710, the text message is transmitted 712 over a wireless network.

Alternatively, when the decision 704 determines that a text message is to be formed, then a text entry screen is displayed 714. Next, a decision 716 determines whether a text message has been entered. When the decision 716 determines that a text message has not yet been entered, then the reply message process 700 awaits entry of the text message. Once the text message has been entered, the text message is transmitted 712 over the wireless network. Following the block 712, the reply message process 700 ends.

Although the reply message process 700 provides for the user to enter a custom text or audio message, it should be understood that the reply message can alternatively be formed through use of semi-custom or predetermined reply messages from which the user of the mobile communication device can choose. The use of semi-custom or predetermined reply messages can be achieved as noted above in a number of embodiments, and can serve to simplify the conversion process.

An exemplary scenario of how message presentation and reply message processes could work according to one implementation of the second aspect is as follows:

1. From his mobile phone, Bill prepares and sends a text message to Tom's mobile phone.

2. Tom is alerted by his mobile phone of an incoming text message, such as by displaying at least a portion of the text message and/or otherwise notifying Tom of the text message.

3. Tom's mobile phone can decide whether to present the text message on a display screen of Tom's mobile phone, or to first convert the text message to an audio message and then present the audio message to Tom (e.g., play the audio message). Of course, Tom can interact with Tom's mobile phone to assist in making the determination on how to present the message.

4. Thereafter, if desired, Tom can prepare and send a reply message back to Bill. This reply message can be prepared initially as a text message or an audio message. Tom's mobile phone and/or Tom can determine whether the reply message is initially prepared as a text message or as an audio message. If an audio message is initially created, such audio message must be converted to a text message prior to transmission. Eventually, the reply message is sent to Bill as a text message. Tom's mobile phone can assist with the creation of the reply message through use of custom, semi-custom or predetermined reply message from which Tom and/or Tom's mobile phone can choose.

5. If Tom is using a head-set with his mobile phone, then an audio message may be more convenient, assuming that Tom wants to provide a particular (i.e., customized) message to Bill. The head-set allows Tom to easily record a brief audio message. Less conveniently, the head-set can be used to present a list of predetermined audio messages and allow Tom's selection therefrom by a button or voice-command.

6. If Tom is not using a head-set, then a text message response might be more suitable. This would typically require that Tom's mobile phone have a display and a keypad. Even so, without a head-set, Tom could still record an audio message, though such would likely be less convenient.

7. Tom can also not provide a reply message and simply not respond to the incoming text message. Alternatively, Tom can configure his mobile phone to automatically produce and send a reply message based on user settings or preferences, position, configuration, status, etc.

In this aspect of the invention, the calling party and the called party often use mobile communication devices, such as mobile phones. However, the parties can alternatively use other electronic devices, such as a PDA, a computer, etc.

The advantages of the invention exemplified by FIGS. 11-12 are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. Still another advantage is that conversion of an audio message to a text message facilitates use a low cost network (such as the SMS network). Another advantage is reduced network bandwidth load. Yet still another advantage is that the sender can get back a message in the same format as they sent the original message, though the recipient may use the message in a different format or mode (e.g., recipient hears the text message as an audio message).

Moreover, it should be noted that with regards to any of the embodiments in which a voice call or a text message is incoming to an electronic device, not only can the user of the mobile device take an action (e.g., button press or voice-command) to decline the call/message but also the electronic device itself can automatically decline the call/message such that the user is not disturbed. For example, an electronic device can be configured through user settings (e.g., preferences) to decline calls/messages matching certain criteria. Also, an auto reply message can be configured to be automatically sent in response to the call/message. For a known, undesired marketing caller/message sender, the electronic device can automatically send a reply message demanding the sender not to call or send messages anymore, and to remove your information from their database.

Text messages received or sent can optionally embed indications of speech characteristics to be used, should the text message be converted to an audio format. The speech characteristics can pertain to voice, tone, pace, accent, and/or mood. The speech characteristics for the resulting speech can be set in preference or configuration information, set on a per message basis by users, or set by evaluation of monitored data pertaining to the user.

Additionally, the messages being transmitted can be encrypted for security purposes.

In one embodiment, an electronic device performing communications using audio and/or text messages according to the invention can further integrate (or have tethered thereto) one or more electrical components for enhancing the hearing of the user of the electronic device. The electronic device will normally include a microphone and a speaker. In any case, additional details on hearing enhancement are further described, for example, in U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES," which is hereby incorporated herein by reference.

The invention described herein can be considered an automated secretary for a user of an electronic device. The automated secretary can completely or partially respond to an incoming call/message so as to reduce disturbances to the user. The user can personalize the automated secretary through user settings (e.g., preferences), or the automated secretary can learn over time how to handle different incoming calls/messages. Besides handling or assisting the user with incoming calls/messages, the automated secretary can also assist with other activities, such as making calendar entries (e.g., meetings) in a calendar or responding to incoming callers/messages with relevant information pertaining to the user's schedule as maintained by the calendar (though the user could restrict such access to certain information and/or inquiring parties). For example, if an incoming text message asks "available for lunch today?", the automated secretary can check the user's availability for lunch by way of the user's calendar, then if the user is not available the automated secretary can quickly informing the inquiring party of same or propose another date. On the other hand, if the lunch time period is available in the user's calendar, then the automated secretary can either directly respond to the inquiring party of acceptance or propose a response to the user for review, modification and/or transmission.

Furthermore, the embodiments implementations and features described in: (i) U.S. Provisional Patent Application 60/509,631, filed Oct. 9, 2003, and entitled "TETHERED ELECTRICAL COMPONENTS FOR EYEGLASSES," which is hereby incorporated herein by reference; and (ii) U.S. Provisional Patent Application 60/462,591, filed Apr. 15, 2003, and entitled "EYEGLASSES FOR WIRELESS COMMUNICATION," which is hereby incorporated herein by reference; (iii) U.S. patent application Ser. No. 10/964,011, filed Oct. 12, 2004, and entitled "TETHERED ELECTRICAL COMPONENTS FOR EYEGLASSES," which is hereby incorporated herein by reference; and (iv) U.S. patent application Ser. No. 10/822,218, filed Apr. 12, 2004, and entitled "EYEGLASSES FOR WIRELESS COMMUNICATIONS," which is hereby incorporated herein by reference, can be used with the various embodiments, implementations, features and aspects of the invention noted above. For example some or all of the processing noted above with respect to FIGS. 6-12 can be performed in electrical components integral or tethered to eyeglasses. However, the electrical components integral or tethered to eyeglasses can also interact and/or share processing tasks with an electrical device (e.g., mobile telephone, PDA, etc.) located proximate thereto.

It should be obvious to those skilled in the art that a number of embodiments performing communications using voice as well as audio and/or text messages can be implemented using voice over Internet Protocol technologies, with signals delivered over the Web. For example, a calling party's communication or mobile device can include an adapter to convert voice signals to data packets before sending them over the Internet. A service provider can convert the packets back into voice signals before sending the voice signals to the called party's communication device. Similarly, embodiments can be implemented using voice over wireless protocols, such as Wi-Fi or Wi-Max networks. Using such technologies, computing devices can become communication devices.

The various embodiments, implementations, features and aspects of the invention noted above can be combined in various ways or used separately. Those skilled in the art will understand from the description that the invention can be equally applied to or used in other different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A non-transitory computer readable medium including at least executable computer program code stored therein for facilitating electronic communications of a plurality of users using a network-based portal on one or more network servers, the computer readable medium comprising:

computer program code for providing a plurality of modes of communication to an electronic device of a first user to allow the first user to use at least one of the plurality of modes of communication as a selected mode of communication for a message from the first user to be sent from the electronic device of the first user to at least an electronic device of a second user, in a session, based on an identifier associated with the first user previously set by the first user via the network-based portal on the one or more network servers, with the plurality of modes of communication provided by the network-based portal including at least voice communication using at least a personal computer, voice communication using at least a mobile phone, and communication using at least an image, and with messages eligible to be received by at least the electronic device of the second user via the network-based portal, using any of the plurality of modes of communication, all based on an identifier associated with the second user previously set by the second user via the network-based portal to identify the second user in the network-based portal;

computer program code for preventing the electronic device of the second user to receive the message from the electronic device of the first user via the network-based portal, at least based on the identifier associated with the first user, and at least based on an input from the second user;

computer program code for receiving a message from the second user via the electronic device of the second user for sending to at least the electronic device of the first user, in the session; and computer program code for identifying data regarding availability of the second user and data regarding availability of the first user, wherein contact information associated with the second user and provided by the second user to the network-based portal is not provided via the network-based portal to the electronic device of the first user, and contact information associated with the first user and provided by the first user to the network-based portal is not provided via the network-based portal to the electronic device of the second user, wherein the contact information associated with the second user allows the second user to be contacted via the contact information without using the network-based portal, wherein the contact information associated with the first user allows the first user to be contacted via the contact information without using the network-based portal, wherein the identifier associated with the second user is distinct from the contact information associated with the second user, wherein the identifier associated with the first user is distinct from the contact information associated with the first user, wherein the contact information associated with the second user includes at least one of a phone number or an email address of the second user, and wherein the contact information associated with the first user includes at least one of a phone number or an email address of the first user.

2. A non-transitory computer readable medium as recited in claim 1, wherein the computer readable medium comprises computer program code for enabling the second user to select, via the electronic device of the second user, a predetermined message to send to the electronic device of the first user, the predetermined message being selected from a set of predetermined messages provided to the electronic device of the second user.

3. A non-transitory computer readable medium as recited in claim 1,
wherein the computer readable medium comprises computer program code for receiving an indication from the electronic device of the second user to generate an urgent notification for the electronic device of the first user,
wherein the urgent notification is generated at least using sound, and
wherein the urgent notification is provided to the electronic device of the first user, even when the electronic device of the first user has been prevented from receiving the message from the second user at least based on an input from the first user.

4. A non-transitory computer readable medium as recited in claim 1, wherein the computer readable medium comprises:
computer program code for enabling the electronic device of the first user to not receive messages from electronic devices of a first plurality of users using at least voice communication via the network-based portal; and
computer program code for enabling the electronic device of the first user to receive messages from electronic devices of a second plurality of users using at least voice communication via the network-based portal.

5. A non-transitory computer readable medium as recited in claim 1, wherein the network-based portal is configured to use at least UDP.

6. A non-transitory computer readable medium as recited in claim 1, wherein the computer readable medium comprises computer program code for at least the electronic device of the first user and the electronic device of the second user to support communications enabling at least the first user and the second user to collaborate in achieving one or more goals using their respective electronic devices.

7. A non-transitory computer readable medium as recited in claim 1, wherein the selected mode of communication for the message from the first user is voice communication.

8. A non-transitory computer readable medium as recited in claim 7, wherein the computer readable medium comprises computer program code for enabling another message to be provided to the electronic device of the second user from the electronic device of the first user, in the session, with the another message based on a mode of communication in the plurality of modes of communication that is different from the selected mode, even when the electronic device of the second user has been prevented from receiving the message from the first user at least based on the input from the second user.

9. A non-transitory computer readable medium as recited in claim 8, wherein the mode of communication different from the selected mode includes communication using at least an image and sound.

10. A non-transitory computer readable medium as recited in claim 9, wherein the computer readable medium comprises computer program code for enabling the second user to select, via the electronic device of the second user, a predetermined message to send to the electronic device of the first user, the predetermined message being selected from a set of predetermined messages provided to the electronic device of the second user.

11. A non-transitory computer readable medium as recited in claim 10,
wherein the computer readable medium comprises computer program code for receiving an indication from the electronic device of the second user to generate an urgent notification for the first user, and
wherein the urgent notification is generated at least using sound.

12. A non-transitory computer readable medium as recited in claim 11, wherein the urgent notification is provided to the electronic device of the first user, even when the electronic device of the first user has been prevented from receiving the message from the second user at least based on an input from the first user.

13. A non-transitory computer readable medium as recited in claim 12, wherein the computer readable medium comprises:
computer program code for enabling the electronic device of the first user to not receive messages from electronic devices of a first plurality of users using at least voice communication via the network-based portal; and
computer program code for enabling the electronic device of the first user to receive messages from electronic devices of a second plurality of users using at least voice communication via the network-based portal.

14. A non-transitory computer readable medium as recited in claim 13, wherein voice communication is configured to be implemented using at least Voice over Internet Protocol technologies.

15. A non-transitory computer readable medium as recited in claim 14, wherein the network-based portal is configured to use at least UDP.

16. A non-transitory computer readable medium as recited in claim 13,
wherein the plurality of modes of communication include a mode of communication based on the electronic device of the first user selected from one of an electronic device with a physical keyboard and an electronic device without a physical keyboard, and the electronic device of the second user selected from the other one of the electronic device with a physical keyboard and the electronic device without a physical keyboard.

17. A non-transitory computer readable medium as recited in claim 13, wherein the plurality of modes of communication include a mode of communication based on the electronic device of the first user and the electronic device of the second user being personal computers.

18. A non-transitory computer readable medium as recited in claim 13, wherein the plurality of modes of communication include a mode of communication based on the electronic device of the first user and the electronic device of the second user being mobile phones.

19. A non-transitory computer readable medium as recited in claim 13, wherein the plurality of modes of communication include a mode of communication based on the electronic device of the first user selected from one of a personal computer and a mobile phone, and the electronic device of the second user selected from the other one of the personal computer and the mobile phone.

20. A non-transitory computer readable medium as recited in claim 13, wherein the message from the second user uses a mode of communication that is not communication using text.

21. A non-transitory computer readable medium as recited in claim 13, wherein the plurality of modes of communication include a mode of communication based on the electronic device of the first user comprising a headset.

22. A non-transitory computer readable medium as recited in claim 13, wherein the predetermined message includes an image.

23. A non-transitory computer readable medium including at least executable computer program code stored therein for facilitating electronic communications of a plurality of users, including a first user, using a network-based portal on one or more network servers, with the first user having a mobile device wirelessly coupled to a headset that includes at least a speaker and a microphone, the computer readable medium comprising:
computer program code for receiving a message from a second user, from an electronic device of the second user, based on an identifier associated with the second user previously set by the second user via the network-based portal on the one or more network servers, with the second user attempting to convey the message from the second user to the mobile device of the first user,
computer program code for identifying a level of priority regarding the second user from a plurality of levels, with the level of priority of the second user previously set by the first user at least based on the identifier of the second user, and with at least a level in the plurality of levels configured to indicate that a corresponding message from the second user would not be received by the first user;
computer program code for determining that the message from the second user is to be presented to the first user, at least based on the level of priority of the second user, leading to the message from the second user to be presented to the first user; and
computer program code for determining that the message from the second user is not to be presented to the first user, at least based on the level of priority of the second user, leading to the message from the second user not to be presented to the first user,
wherein contact information associated with the first user and provided by the first user to the network-based portal is not provided via the network-based portal to the electronic device of second user, and contact information associated with the second user and provided by the second user to the network-based portal is not provided via the network-based portal to the mobile device of first user, allowing the first user to keep the contact information associated with the first user from the second user, and allowing the second user to keep the contact information associated with the second user from the first user,
wherein the contact information associated with the second user allows the second user to be contacted via the contact information without using the network-based portal,
wherein the contact information associated with the first user allows the first user to be contacted via the contact information without using the network-based portal,
wherein the identifier associated with the second user is distinct from the contact information associated with the second user, and
wherein the contact information associated with the second user includes at least one of a phone number or an email address of the second user.

24. A non-transitory computer readable medium as recited in claim 23,
wherein the computer readable medium comprises computer program code to receive an attribute of the message from the second user regarding urgency, wherein the attribute of the message regarding urgency can be set by the second user via the electronic device of the second user, and
wherein the computer readable medium comprises computer program code for enabling the message to be presented from the second user indicating the urgency to at least the mobile device of first user if the second user has set the attribute.

25. A non-transitory computer readable medium as recited in claim 24, wherein the determining that the message from the second user is to be presented is at least based on a current activity of the first user.

26. A non-transitory computer readable medium as recited in claim 23,
wherein the message from the second user includes voice communication, and the voice communication is configured to be implemented using at least Voice over Internet Protocol technologies, and
wherein the network-based portal is configured to use at least UDP.

27. A non-transitory computer readable medium including at least executable computer program code stored therein for facilitating electronic communications of a plurality of users using a network-based portal on one or more network servers, the computer readable medium comprising:
computer program code for providing a plurality of modes of communication to an electronic device of a first user to allow the first user to use at least one of the plurality of modes of communication as a selected mode of communication for a message from the first user to be sent from the electronic device of the first user to at least an electronic device of a second user, based on an identifier associated with the first user previously set by the first user via the network-based portal on the one or more network servers, with the plurality of modes of communication provided by the network-based portal including at least voice communication using at least a personal computer, voice communication using at least a mobile phone, and communication using at least an image, and with messages eligible to be received by at least the electronic device of the second user via the network-based portal using any of the plurality of modes of communication, all based on an identifier associated with the second user previously set by the second user via the network-based portal to identify the second user in the network-based portal;

computer program code for preventing the electronic device of the second user to receive the message from the electronic device of the first user via the network-based portal, at least based on the identifier associated with the first user, and at least based on an input from the second user; and computer program code for receiving a message from the second user via the electronic device of the second user for sending to at least the electronic device of the first user, wherein the computer readable medium comprises computer program code for identifying data regarding availability of the second user and data regarding availability of the first user, wherein contact information associated with the second user and provided by the second user to the network-based portal is not provided via the network-based portal to the electronic device of the first user, and contact information associated with the first user and provided by the first user to the network-based portal is not provided via the network-based portal to the electronic device of the second user, wherein the contact information associated with the second user at least allows the second user to be contacted via the contact information without using the network-based portal, wherein the contact information associated with the first user at least allows the first user to be contacted via the contact information without using the network-based portal, wherein the identifier associated with the second user is distinct from the contact information associated with the second user, wherein the identifier associated with the first user is distinct from the contact information associated with the first user, wherein the contact information associated with the second user includes at least one of a phone number or an email address of the second user, and wherein the contact information associated with the first user includes at least one of a phone number or an email address of the first user.

28. A non-transitory computer readable medium as recited in claim 27, wherein the selected mode of communication for the message from the first user includes voice communication.

29. A non-transitory computer readable medium as recited in claim 28, wherein the computer readable medium comprises computer program code for enabling another message to be provided to the electronic device of the second user from the electronic device of the first user, with the another message based on a mode of communication in the plurality of modes of communication that is different from the selected mode, even when the electronic device of the second user has been prevented from receiving the message from the first user at least based on the input from the second user.

30. A non-transitory computer readable medium as recited in claim 29, wherein the mode of communication different from the selected mode includes communication using at least an image and sound.

31. A non-transitory computer readable medium as recited in claim 30, wherein the message from the second user includes a predetermined message, and wherein the computer readable medium comprises computer program code for enabling the second user to select, via the electronic device of the second user, the predetermined message from a set of predetermined messages provided to the electronic device of the second user.

32. A non-transitory computer readable medium as recited in claim 31, wherein the another message includes an urgent notification, and wherein the computer readable medium comprises computer program code for receiving an indication from the electronic device of the first user to generate the urgent notification for the second user.

33. A non-transitory computer readable medium as recited in claim 32, wherein the computer readable medium comprises:

computer program code for enabling the electronic device of the second user to not receive messages from electronic devices of a first plurality of users using at least voice communication, via the network-based portal; and computer program code for enabling the electronic device of the second user to receive messages from electronic devices of a second plurality of users using at least voice communication, via the network-based portal.

34. A non-transitory computer readable medium as recited in claim 33, wherein the predetermined message includes an image.

35. A non-transitory computer readable medium as recited in claim 34, wherein the plurality of modes of communication include a mode of communication based on the electronic device of the first user selected from one of a personal computer and a mobile phone, and the electronic device of the second user selected from the other one of the personal computer and the mobile phone.

36. A non-transitory computer readable medium as recited in claim 35, wherein the plurality of modes of communication include a mode of communication based on the electronic device of the first user including a headset.

37. A non-transitory computer readable medium as recited in claim 35, wherein the network-based portal is configured to use at least Voice over Internet Protocol and UDP.

38. A non-transitory computer readable medium including at least executable computer program code stored therein for facilitating electronic communications of a plurality of users using a network-based portal on one or more network servers, the computer readable medium comprising:

computer program code for providing a plurality of modes of communication to an electronic device of a first user to allow the first user to use at least one of the plurality of modes of communication as a selected mode of communication for a first message from the first user to be sent from the electronic device of the first user to at least an electronic device of a second user, in a session, based on an identifier associated with the first user previously set by the first user via the network-based portal on the one or more network servers, with the plurality of modes of communication provided by the network-based portal including at least voice communication using at least a personal computer, voice communication using at least a mobile phone, and communication using at least an image, and with messages eligible to be received by at least the electronic device of the second user via the network-based portal, using any of the plurality of modes of communication, all based on an identifier associated with the second user previously set by the second user via the network-based portal to identify the second user in the network-based portal;

computer program code for preventing the electronic device of the second user to receive the first message from the electronic device of the first user via the network-based portal, at least based on the identifier associated with the first user, and at least based on an input from the second user;

computer program code for receiving a second message from the second user via the electronic device of the second user for sending to at least the electronic device of the first user, in the session; and wherein contact information associated with the second user and provided by the second user to the network-based portal is not provided via the network-based portal to the electronic device of the first user, and contact information associated with the first user and provided by the first user to the network-based portal is not provided via the network-based portal to the electronic device of the second user, wherein the contact information associated with the second user at least allows the second user to be contacted via the contact information without using the network-based portal, wherein the contact information associated with the first user at least allows the first user to be contacted via the contact information without using the network-based portal, wherein the identifier associated with the second user is distinct from the contact information associated with the second user, wherein the identifier associated with the first user is distinct from the contact information associated with the first user, wherein the contact information associated with the second user includes at least one of a phone number or an email address of the second user, wherein the contact information associated with the first user includes at least one of a phone number or an email address of the first user, wherein the selected mode of communication for the first message from the first user includes voice communication, wherein the second message from the second user includes a predetermined message, wherein the computer readable medium comprises computer program code for enabling the second user to select, via the electronic device of the second user, the predetermined message from a set of predetermined messages provided to the electronic device of the second user, wherein the computer readable medium comprises computer program code for enabling the electronic device of the second user to not receive messages from electronic devices of a first plurality of users using at least voice communication, in the session, via the network-based portal, wherein the computer readable medium comprises computer program code for enabling the electronic device of the second user to receive messages from electronic devices of a second plurality of users using at least voice communication, in the session, via the network-based portal, wherein the predetermined message includes an image, and wherein the plurality of modes of communication include a mode of communication based on the electronic device of the first user selected from one of a personal computer and a mobile phone, and the electronic device of the second user selected from the other one of the personal computer and the mobile phone.

39. A non-transitory computer readable medium as recited in claim 38 comprising computer program code for enabling another message to be provided to the electronic device of the second user from the electronic device of the first user, in the session, with the another message based on a mode of communication in the plurality of modes of communication that is different from the selected mode, even when the electronic device of the second user has been prevented from receiving the first message from the first user at least based on the input from the second user, wherein the mode of communication different from the selected mode includes communication using at least an image and sound, wherein the another message includes an urgent notification, and wherein the computer readable medium comprises computer program code for receiving an indication from the electronic device of the first user to generate the urgent notification.

40. A non-transitory computer readable medium as recited in claim 39, wherein the network-based portal is configured to use at least Voice over Internet Protocol and UDP.

41. A network server system, including at least one network server, configured to implement a network-based portal on the network server system for facilitating electronic communications of a plurality of users, the network server system comprising:

at least one processor; and at least one storage device storing at least executable computer program code that, when executed by the at least one processor, causes the at least one processor to:

provide a plurality of modes of communication to an electronic device of a first user to allow the first user to use at least one of the plurality of modes of communication as a selected mode of communication for a message from the first user to be sent from the electronic device of the first user to at least an electronic device of a second user, in a session, based on an identifier associated with the first user previously set by the first user via the network-based portal on the network server system, with the plurality of modes of communication provided by the network-based portal including at least voice communication using at least a personal computer, voice communication using at least a mobile phone, and communication using at least an image, and with messages eligible to be received by at least the electronic device of the second user via the network-based portal, using any of the plurality of modes of communication, all based on an identifier associated with the second user previously set by the second user via the network- based portal to identify the second user in the network-based portal;

prevent the electronic device of the second user to receive the message from the electronic device of the first user via the network-based portal, at least based on the identifier associated with the first user, and at least based on an input from the second user;

receive a message from the second user via the electronic device of the second user for sending to at least the electronic device of the first user, in the session; and identify data regarding availability of the second user and data regarding availability of the first user, wherein contact information associated with the second user and provided by the second user to the network-based portal is not provided via the network-based portal to the electronic device of the first user, and contact information associated with the first user and provided by the first user to the network-based portal is not provided via the network-based portal to the electronic device of the second user, so that the contact information associated with the second user is kept from the first user, and so that the contact information associated with the first user is kept from the second user, wherein the contact information associated with the second user allows the second user to be contacted via the contact information without using the network-based portal, wherein the contact information associated with the first user allows the first user to be contacted via the contact information without using the network-based portal, wherein the identifier associated with the second user is distinct from the contact information associated with the second user, wherein the identifier associated with the first user is distinct from the contact information associated with the first user, wherein the contact information associated with the second user includes at least one of a phone number or an email address of the second user, and wherein the contact information associated with the first user includes at least one of a phone number or an email address of the first user.

42. A network server system as recited in claim 41, wherein the network-based portal is configured to use at least UDP.

43. A network server system as recited in claim 41, wherein the at least one storage device stores at least executable computer program code that, when executed by the at least one processor, causes the at least one processor to enable another message to be provided to the electronic device of the second user from the electronic device of the first user, in the session, with the another message based on a mode of communication in the plurality of modes of communication that is different from the selected mode, even when the electronic device of the second user has been prevented from receiving the message from the first user at least based on the input from the second user.

44. A network server system as recited in claim 43, wherein the mode of communication different from the selected mode includes communication using at least an image and sound.

45. A network server system as recited in claim 41, wherein the at least one storage device stores at least executable computer program code that, when executed by the at least one processor, causes the at least one processor to enable the second user to select, via the electronic device of the second user, a predetermined message to send to the electronic device of the first user, the predetermined message being selected from a set of predetermined messages provided to the electronic device of the second user.

46. A network server system as recited in claim 45, wherein the predetermined message includes an image.

47. A network server system as recited in claim 41, wherein the plurality of modes of communication include a mode of communication based on the electronic device of the first user selected from one of an electronic device with a physical keyboard and an electronic device without a physical keyboard, and the electronic device of the second user selected from the other one of the electronic device with a physical keyboard and the electronic device without a physical keyboard.

48. A network server system as recited in claim 41, wherein the plurality of modes of communication include a mode of communication based on the electronic device of the first user selected from one of a personal computer and a mobile phone, and the electronic device of the second user selected from the other one of the personal computer and the mobile phone.

49. A network server system as recited in claim 41, wherein the plurality of modes of communication include a mode of communication based on the electronic device of the first user comprising a headset.

50. A network server system as recited in claim 41,
wherein the at least one storage device stores at least executable computer program code that, when executed by the at least one processor, causes the at least one processor to receive an indication from the electronic device of the second user to generate an urgent notification for the first user, and wherein the urgent notification is generated at least using sound.

51. A network server system as recited in claim 50, wherein the at least one storage device stores at least executable computer program code that, when executed by the at least one processor, causes the at least one processor to enable the second user to select, via the electronic device of the second user, a predetermined message to send to the electronic device of the first user, the predetermined message being selected from a set of predetermined messages provided to the electronic device of the second user.

52. A network server system as recited in claim 51, wherein the plurality of modes of communication include a mode of communication based on the electronic device of the first user selected from one of a personal computer and a mobile phone, and the electronic device of the second user selected from the other one of the personal computer and the mobile phone.

53. A network server system as recited in claim 52, wherein the at least one storage device stores at least executable computer program code that, when executed by the at least one processor, causes the at least one processor to enable another message to be provided to the electronic device of the second user from the electronic device of the first user, in the session, with the another message based on a mode of communication in the plurality of modes of communication that is different from the selected mode, even when the electronic device of the second user has been prevented from receiving the message from the first user at least based on the input from the second user.

54. A network server system, including at least one network server, configured to implement a network-based portal on the network server system for facilitating electronic communications of a plurality of users, the network server system comprising:

at least one processor; and at least one storage device storing at least executable computer program code that, when executed by the at least one processor, causes the at least one processor to:

provide a plurality of modes of communication to an electronic device of a first user to allow the first user to use at least one of the plurality of modes of communication as a selected mode of communication for a first message from the first user to be sent from the electronic device of the first user to at least an electronic device of a second user, in a session, based on an identifier associated with the first user previously set by the first user via the network-based portal on the network server system, with the plurality of modes of communication provided by the network-based portal including at least voice communication using at least a personal computer, voice communication using at least a mobile phone, and communication using at least an image, and with messages eligible to be received by at least the electronic device of the second user via the network-based portal, using any of the plurality of modes of communication, all based on an identifier associated with the second user previously set by the second user via the network-based portal to identify the second user in the network-based portal;

prevent the electronic device of the second user to receive the first message from the electronic device of the first user via the network-based portal, at least based on the identifier associated with the first user, and at least based on an input from the second user;

receive a second message from the second user via the electronic device of the second user for sending to at least the electronic device of the first user, in the session;

identify data regarding availability of the second user and data regarding availability of the first user;

receive an indication from the electronic device of the second user to generate an urgent notification for the first user, wherein the urgent notification is generated at least using sound;

enable the second user to select, via the electronic device of the second user, a predetermined message to send to the electronic device of the first user, the predetermined message being selected from a set of predetermined messages provided to the electronic device of the second user; and enable another message to be provided to the electronic device of the second user from the electronic device of the first user, in the session, with the another message based on a mode of communication in the plurality of modes of communication that is different from the selected mode, even when the electronic device of the second user has been prevented from receiving the first message from the first user at least based on the input from the second user, wherein contact information associated with the second user and provided by the second user to the network-based portal is not provided via the network-based portal to the electronic device of the first user, and contact information associated with the first user and provided by the first user to the network-based portal is not provided via the network-based portal to the electronic device of the second user, wherein the contact information associated with the second user allows the second user to be contacted via the contact information without using the network-based portal, wherein the contact information associated with the first user allows the first user to be contacted via the contact information without using the network-based portal, wherein the identifier associated with the second user is distinct from the contact information associated with the second user, wherein the identifier associated with the first user is distinct from the contact information associated with the first user, wherein the contact information associated with the second user includes at least one of a phone number or an email address of the second user, wherein the contact information associated with the first user includes at least one of a phone number or an email address of the first user, and wherein the plurality of modes of communication include a mode of communication based on the electronic device of the first user selected from one of a personal computer and a mobile phone, and the electronic device of the second user selected from the other one of the personal computer and the mobile phone.

* * * * *

UNITED STATES PATENT AND TRADEMARK OFFICE
CERTIFICATE OF CORRECTION

PATENT NO. : 11,800,329 B2
APPLICATION NO. : 16/794458
DATED : October 24, 2023
INVENTOR(S) : Kwok Wai Cheung et al.

Page 1 of 1

It is certified that error appears in the above-identified patent and that said Letters Patent is hereby corrected as shown below:

In the Specification

Column 11, Line 63 "message." should be --messages.--

Column 12, Line 40 "sage will" should be --message will--

Signed and Sealed this
Second Day of September, 2025

Coke Morgan Stewart
*Acting Director of the United States Patent and Trademark Office*